US008832671B1

(12) United States Patent
Patney et al.

(10) Patent No.: US 8,832,671 B1
(45) Date of Patent: Sep. 9, 2014

(54) CONFLICT-FREE REGISTER ALLOCATION

(75) Inventors: Anjul Patney, Davis, CA (US); William J. Dally, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 599 days.

(21) Appl. No.: 12/831,957

(22) Filed: Jul. 7, 2010

(51) Int. Cl.
G06F 9/44 (2006.01)
G06F 9/30 (2006.01)
G06F 9/45 (2006.01)

(52) U.S. Cl.
CPC .............. *G06F 9/3012* (2013.01); *G06F 8/441* (2013.01)
USPC ........... 717/151; 717/152; 717/153; 717/158; 712/216

(58) Field of Classification Search
None
See application file for complete search history.

(56) References Cited

U.S. PATENT DOCUMENTS

| 4,571,678 | A | * | 2/1986 | Chaitin | 717/156 |
| 5,249,295 | A | * | 9/1993 | Briggs et al. | 717/157 |
| 5,408,673 | A | * | 4/1995 | Childers et al. | 711/149 |
| 5,784,066 | A | * | 7/1998 | Aizikowitz et al. | 345/440 |
| 5,901,317 | A | * | 5/1999 | Goebel | 717/156 |
| 6,009,272 | A | * | 12/1999 | Goebel | 717/152 |
| 7,185,329 | B1 | * | 2/2007 | Verbitsky | 717/156 |
| 7,469,404 | B2 | * | 12/2008 | Zhang et al. | 717/156 |
| 7,478,374 | B2 | * | 1/2009 | Guilford | 717/140 |
| 7,490,208 | B1 | * | 2/2009 | Yue et al. | 711/167 |
| 7,634,621 | B1 | * | 12/2009 | Coon et al. | 711/149 |
| 8,539,462 | B2 | * | 9/2013 | Wu et al. | 717/144 |
| 8,555,035 | B1 | * | 10/2013 | Patney et al. | 712/216 |
| 2003/0079212 | A1 | * | 4/2003 | Park | 717/154 |
| 2004/0003385 | A1 | * | 1/2004 | Kushlis | 717/158 |
| 2005/0210457 | A1 | * | 9/2005 | Guilford | 717/140 |
| 2006/0002224 | A1 | * | 1/2006 | Zhang et al. | 365/230.03 |
| 2006/0225061 | A1 | | 10/2006 | Ludwig et al. | |
| 2007/0038984 | A1 | * | 2/2007 | Gschwind et al. | 717/136 |
| 2007/0074190 | A1 | * | 3/2007 | Verbitsky | 717/144 |
| 2008/0109611 | A1 | * | 5/2008 | Liu et al. | 711/149 |
| 2008/0215856 | A1 | * | 9/2008 | Gschwind et al. | 712/220 |
| 2009/0064112 | A1 | * | 3/2009 | Inagaki et al. | 717/140 |
| 2012/0297171 | A1 | * | 11/2012 | Gschwind et al. | 712/220 |
| 2012/0297373 | A1 | * | 11/2012 | Gschwind et al. | 717/151 |

FOREIGN PATENT DOCUMENTS

EP 579378 A1 * 1/1994
EP 798636 A1 * 10/1997

OTHER PUBLICATIONS

IBM Technical Disclosure Bulletin NA8106336.*
IBM Technical Disclosure Bulletin NN8006416.*
IBM Technical Disclosure Bulletin NN951189.*

(Continued)

*Primary Examiner* — Steven Snyder
(74) *Attorney, Agent, or Firm* — Zilka-Kotab, PC

(57) ABSTRACT

One embodiment of the present invention sets forth a technique for using a multi-bank register file that reduces the size of or eliminates a switch and/or staging registers that are used to gather input operands for instructions. Each function unit input may be directly connected to one bank of the multi-bank register file with neither a switch nor a staging register. A compiler or register allocation unit ensures that the register file accesses for each instruction are conflict-free (no instruction can access the same bank more than once in the same cycle). The compiler or register allocation unit may also ensure that the register file accesses for each instruction are also aligned (each input of a function unit can only come from the bank connected to that input).

23 Claims, 16 Drawing Sheets

(56) References Cited

OTHER PUBLICATIONS

'Register Allocation via Weighted Graph Coloring (Technical Summary)' from Purdue University Purdue e-Pubs, ECE Technical Reports, Electrical and Computer Engineering, by Russell W. Quong and Shu-Ching Chen on Jun. 1, 1993.*

'Register Allocation & Spilling Via Graph Coloring' by G.J. Chaitin, copyright 1982 by ACM.*

Zhuang, et al. "Resolving Register Bank Conflicts for a Network Processor," Proceedings of the 12th International Conference on Parallel Architectures and Compilation Techniques (PACT'03), 2003.

Preston Briggs. "Register Allocation via Graph Coloring," A thesis Submitted in Partial Fulfillment of the Requirements for the Degree. Apr. 1992.

Patney, A. et al., U.S. Appl. No. 12/831,953, filed Jul. 7, 2010.

Non-Final Office Action from U.S. Appl.No. 12/831,953, dated Feb. 11, 2013.

Zhou et al., "A Register Allocation Framework for Banked Register Files with Access Constraints", Proceeding ACSAC'05, Proceedings of the 10th Asia-Pacific conference on Advances in Computer Systems Architecture Dec. 2005, pp. 269-280.

Park et al., "Register Allocation for Banked Register File", Proceeding OM '01 Proceedings of the 2001 ACM SIGPLAN workshop on Optimization of middleware and distributed systems, vol. 36, Issue 8, Aug. 2001, pp. 39-47.

Notice of Allowance from U.S. Appl. No. 12/831,953, dated Jul. 3, 2013.

* cited by examiner

CONFLICT-FREE REGISTER ALLOCATION

BACKGROUND OF THE INVENTION

1. Field of the Invention

The present invention generally relates to register allocation and more specifically to avoiding access conflicts for registers in a multi-banked register file.

2. Description of the Related Art

To achieve high data processing throughput, processors typically feature a large number of cores, each capable of supporting many threads. Rather than minimize memory latency through the use of caches, these highly-parallel processors instead hide latency to main memory by running many simultaneous threads. Sustaining many threads requires large register files, because the state for each thread must be local to a core to minimize latency.

Building a single, monolithic, multi-ported register file of such a size is impractical for area, power, and performance reasons. Thus, modern large register files are typically partitioned in some manner. One possibility is to statically partition the register file into separate per-thread partitions. The disadvantage of this approach, though, is that it disallows a continuum of processing configurations from few, high-register-count threads to many, small-register-count threads. Also, different threads may have different register usage patterns, but under a thread-partitioned hardware scheme a high register usage thread cannot utilize unused registers from another thread's partition.

An alternate possibility is the use of banked register files in which the register file is divided into multiple smaller banks, each of which can be independently accessed. Typically, each bank has only a single read and write port. This approach is substantially more area-, power-, and latency-efficient than building a large multiported register file. However, banked register files introduce complexity due to the need for a switch to connect each of the different register banks to each of the different inputs to one or more function units. The switch facilitates interconnection between different register file outputs and function unit inputs and consumes significant area and power.

In addition to the switch, a straightforward method to enable full connectivity between function units and banks also requires staging registers. The staging registers compensate for the constraint that at most one operand can be read from each bank on a given clock cycle by holding function unit inputs in the case of conflicts. For instance, if a function unit requires two or more input operands from the same bank the two input operands are read from the same bank during different clock cycles and buffered by the staging registers. The staging registers also require a scheduling mechanism to sequence data into the staging registers. Staging registers not only consume area and power, but also require support for multi-cycle operations that have longer latency.

Accordingly, what is needed in the art is a system and method for reducing size of the switch and staging registers that are needed to eliminate register bank conflicts for banked register files.

SUMMARY OF THE INVENTION

A system and method for using a multi-bank register file that reduces the size of or eliminates a switch and/or staging registers that are used to gather input operands for instructions. Each function unit input may be directly connected to one bank of the multi-bank register file with neither a switch nor a staging register. A compiler or register allocation unit ensures that the register file accesses for each instruction are conflict-free (no instruction can access the same bank more than once in the same cycle). The compiler or register allocation unit may also ensure that the register file accesses for each instruction are also aligned (each input of a function unit can only come from the bank connected to that input).

The advantages of banked register files with conflict-free and aligned accesses single-cycle accesses for operand fetches. Single-cycle accesses reduce single-thread latency and are also area-efficient because they reduce or eliminate the requirement for staging pipeline registers. Finally, aligned accesses reduce overall area by removing the switch that connects register files to the different inputs of each function unit.

Various embodiments of a method of the invention for assigning variables to physical registers stored in a multi-bank register file include, computing a Register Conflict Graph (RCG) for an input program that includes variables represented as nodes in the RCG and assigning at least three banks of the multi-bank register file to the nodes in the RCG. Physical registers are allocated for each of the at least three banks enabling input operands to be read from the multi-bank register file in a single access cycle for each instruction that specifies the input operands to produce a conflict-free register allocation An output program, corresponding to the input program, is generated that uses the conflict-free register allocation.

Various embodiments of the invention include a system for assigning variables to physical registers stored in a multi-bank register file. The system includes a function unit, a register allocation unit, and the multi-bank register file that includes different banks that are configured for parallel access in a single access cycle. The function unit is configured to receive input operands read from the multi-bank register file and execute program instructions that specify the input operands. The register allocation unit is coupled to the multi-bank register file and configured to compute a Register Interference Graph (RIG) for an input program that includes variables represented as nodes in the RIG. The register allocation unit is also configured to allocate the physical registers stored in the multi-bank register file to the nodes in the RIG and compute a Register Conflict Graph (RCG) for the input program that includes the variables represented as nodes in the RCG and uses the physical registers allocated to the nodes in the RIG. The register allocation unit is also configured to assign a bank of the multi-bank register file to each node in the RCG, split a node in the RCG into the node and a copy node to produce a conflict-free register allocation, and generate an output program corresponding to the input program that uses the conflict-free register allocation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
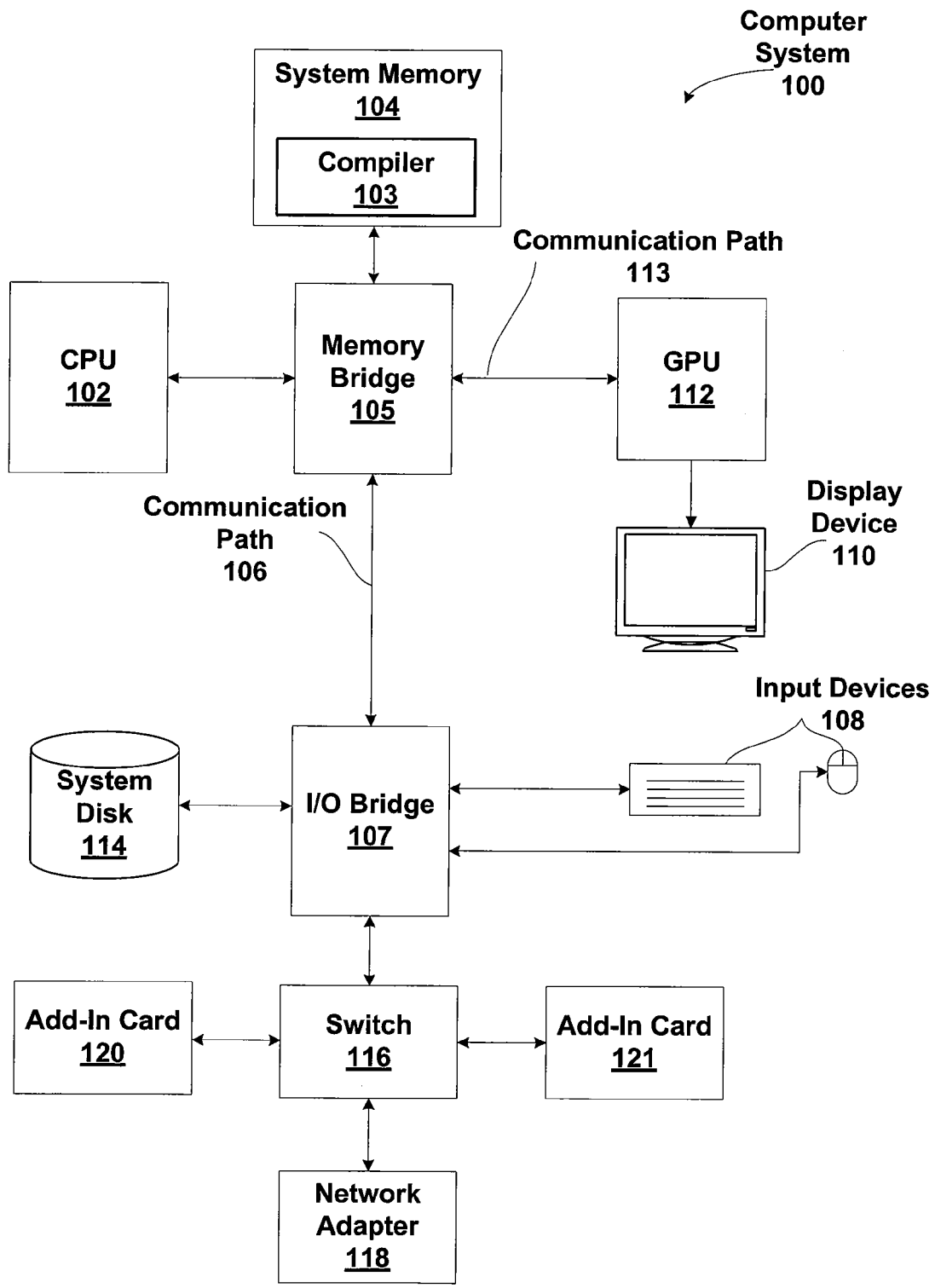
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A graphics processing unit (GPU) 112 is coupled to memory bridge 105 via a bus or other communication path 113 (e.g., a PCI EXPRESS, Accelerated Graphics Port, or HYPER-TRANSPORT link); in one embodiment GPU 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. Communication paths interconnecting the various components in FIG. 1 may be implemented using any suitable protocols, such as PCI (Peripheral Component Interconnect), PCI-EXPRESS, AGP (Accelerated Graphics Port), HYPERTRANSPORT, or any other bus or point-to-point communication protocol(s), and connections between different devices may use different protocols as is known in the art.

In one embodiment, the GPU 112 incorporates circuitry optimized for graphics and video processing, including, for example, video output circuitry. GPU 112 may include one or more rendering pipelines that can be configured to perform various tasks related to generating pixel data from graphics data supplied by CPU 102 and/or system memory 104 via memory bridge 105 and bus 113, interacting with local parallel processing memory (which can be used as graphics memory including, e.g., a conventional frame buffer) to store and update pixel data, delivering pixel data to display device 110, and the like. In another embodiment, the GPU 112 incorporates circuitry optimized for general purpose processing, while preserving the underlying computational architecture, described in greater detail herein. In yet another embodiment, the GPU 112 and or the CPU 102 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of GPUs 112, may be modified as desired. For instance, in some embodiments, system memory 104 is connected to CPU 102 directly rather than through a bridge, and other devices communicate with system memory 104 via memory bridge 105 and CPU 102. In other alternative topologies, GPU 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more GPUs 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

In operation, CPU 102 is the master processor of computer system 100, controlling and coordinating operations of other system components. In particular, CPU 102 issues commands that control the operation of other devices and processing units within the computer system 100. A compiler 103 that is stored in the system memory 104 may be used to pre-process instructions for execution by the CPU 102 and/or the GPU 112. In particular, the compiler 103 may be configured to allocate registers without conflicts for accessing multi-bank register files during the execution of instructions by CPU 102 and/or GPU 112. Additionally, the compiler 103 may be configured to allocate registers of a multi-bank register file that are aligned with function unit inputs when instructions are executed by CPU 102 and/or GPU 112.

Allocation of Conflict-Free Registers

Figure 2A:
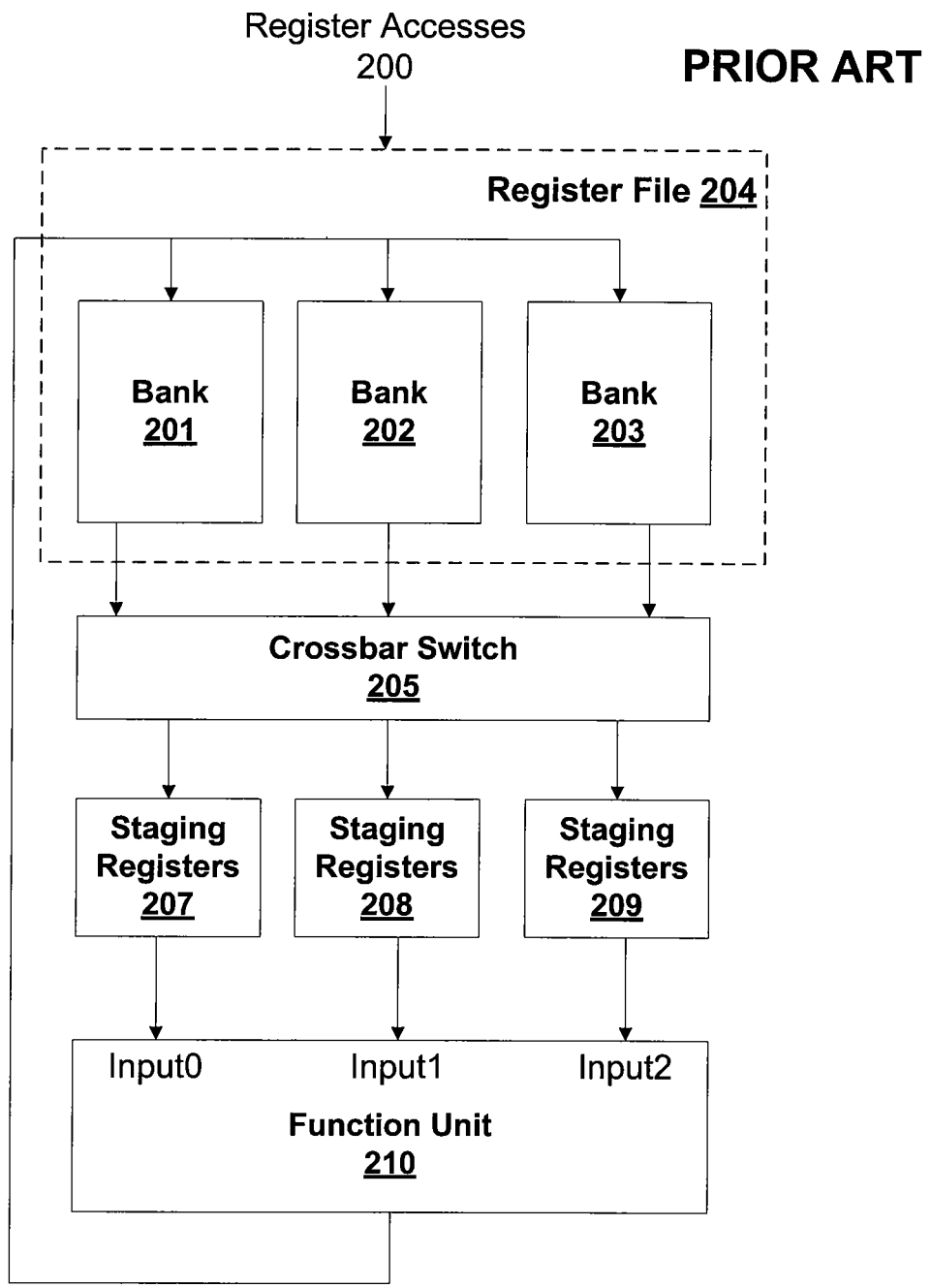
FIG. 2A is a block diagram of a prior art register file that allows bank conflicts and non-aligned operands.

FIG. 2A is a block diagram of a prior art register file 204 that allows bank conflicts and non-aligned operands. The register file 204 is partitioned into $N_B$ register banks, and a function unit 210, e.g., arithmetic logic unit, with $N_I$ input ports and $N_O$ output ports. Thus, while the maximum register request bandwidth is $N_I$ registers per cycle, the available read or write bandwidth is limited to 1 per bank per clock cycle. $N_B$ and $N_I$ can take arbitrary values, but for simplicity assume $N_B$ is greater than or equal to $N_I$ and $N_I = N_B = 3$.

Due to the mismatch between the available and requested bandwidth, and the fact that a register may reside in any bank, an architecture may use staging registers 207, 208, and 209 and a crossbar switch 205. Staging registers 207, 208, and 209 provide intermediate storage whenever two or more requested registers lie in the same bank, and hence cannot be fetched in a single clock cycle. The crossbar switch 205 helps route input operands from all register file banks 201, 202, and 203 to all inputs of the function unit 210, and the reverse for output operands. The crossbar switch 205 and staging registers 207, 208, and 209 also occupy significant area for a register file with a wide datapath.

The amount of intermediate storage in the staging registers 207, 208, and 209 depends not only on the number of input operands the instruction set architecture of a processor allows, but also on whether the processor has a static superscalar or very long instruction word (VLIW) organization. For those cases, operands of all the instructions which are fetched together are executed together, and the worst case delay due to bank conflicts grows quite large. For example, an instruction set architecture which supports executing 4 Floating-Point Multiply-Add (FMAD) instructions in a single cycle, may need storage for up to 12 input operands and 4 output operands. Furthermore, since area efficiency of storage structures decreases for smaller structures, even though staging buffers 207, 208, and 209 carry only a small fraction of the overall capacity of the register file 204, staging buffers 207, 208, and 209 occupy a relatively significant area of the overall circuitry.

Figure 2B:
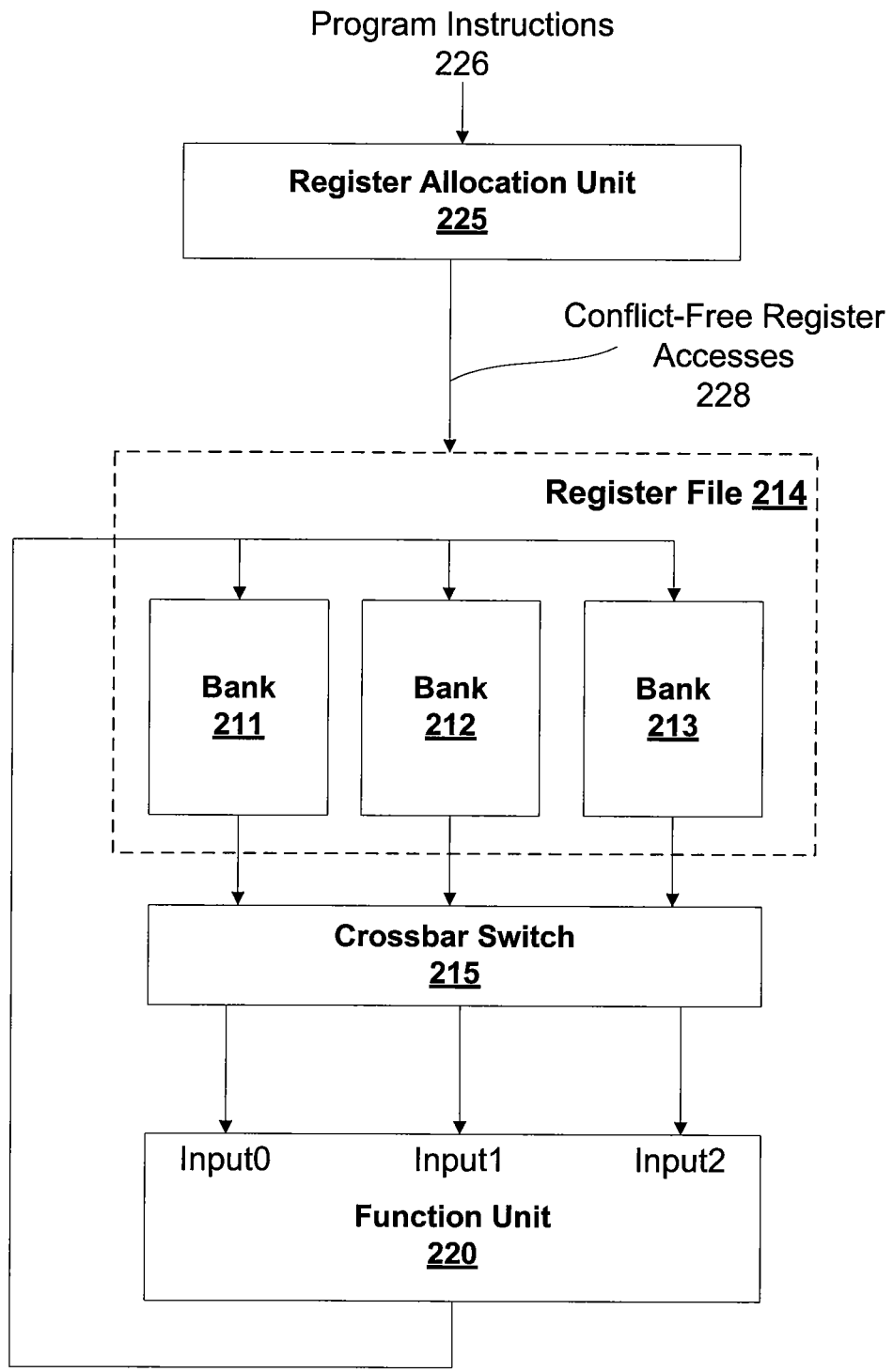
FIG. 2B is a block diagram of a register file design that avoids bank conflicts, according to one embodiment of the present invention.

FIG. 2B is a block diagram of a register file 214 that avoids bank conflicts, according to one embodiment of the present invention. A register allocation unit 225 may be configured to receive a sequence of program instructions 226 and generate conflict-free register accesses 228. In one embodiment, the register allocation unit 225 is omitted and the compiler is configured to generate program instructions having conflict-free register accesses 228. In other words, the register allocation unit 225 may be configured to perform functions otherwise performed by the compiler 103.

When the register allocation unit 225 (or compiler 103) is configured to generate instructions (whether scalar or VLIW) where the operands are always sourced from different register operand banks, the staging buffers 207, 208, and 209 shown in FIG. 2A can be removed, producing the register file 214, crossbar switch 215, and function unit 220, as shown in FIG. 2B. As shown in FIG. 2B, three different input operands for an instruction may be read from the register file 214 in a single clock cycle. One input operand is simultaneously read from each of bank 211, 212, and 213 and routed by the crossbar switch 215 to any one of the inputs of the function unit 220.

The register allocation unit 225 (or compiler 103) is configured to produce programs that are statically guaranteed to be free from register access bank-conflicts so that the input operands may be read from the register file 214 in a single clock cycle.

Figure 2C:
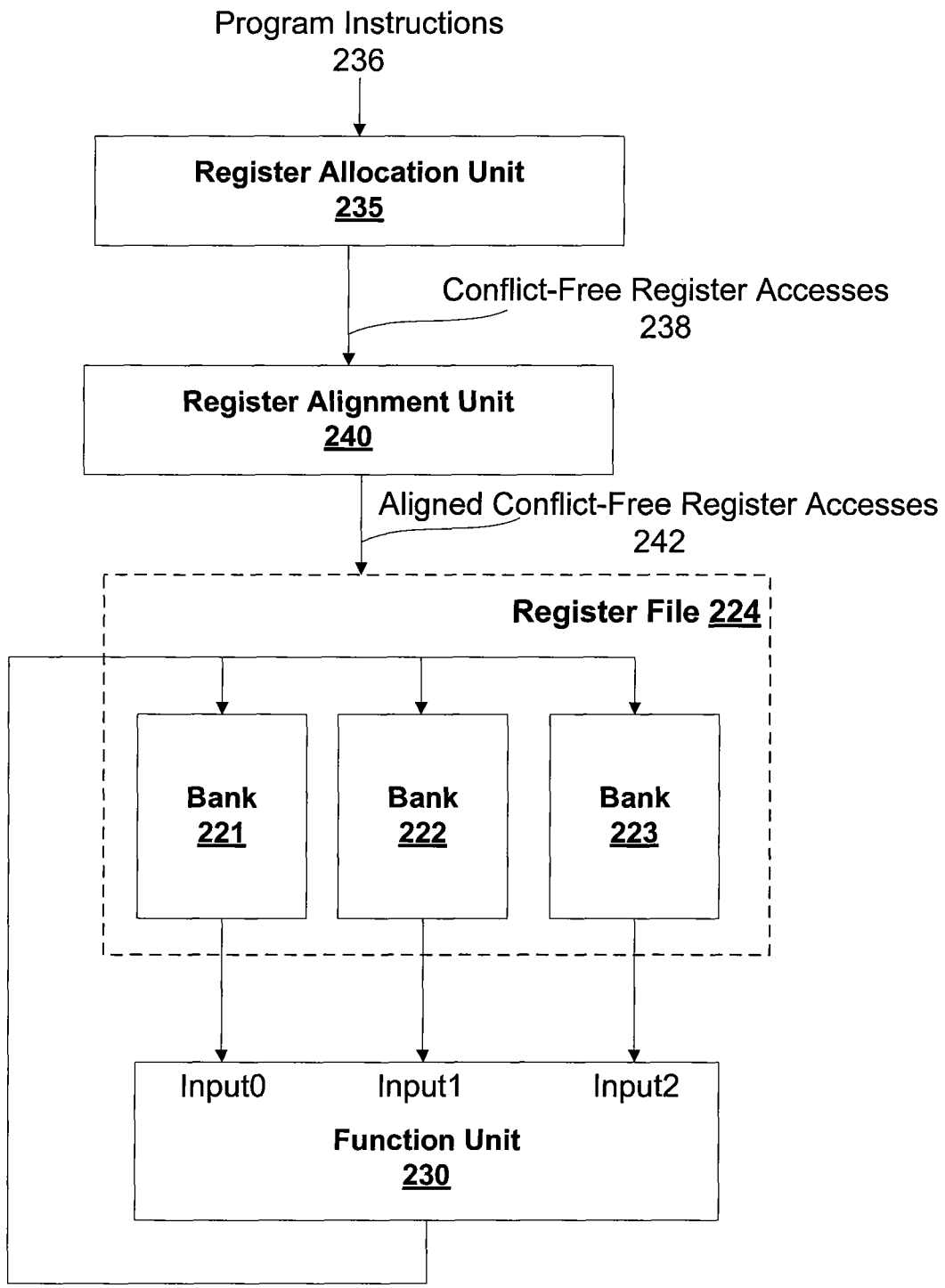
FIG. 2C is a block diagram of a register file design that avoids bank conflicts and assumes operands are aligned, according to one embodiment of the present invention.

FIG. 2C is a block diagram of a register file 224 that avoids bank conflicts and assumes operands are aligned, according to one embodiment of the present invention. A register allocation unit 235 may be configured to receive a sequence of program instructions 236 and generate conflict-free register accesses 238. A register alignment unit 240 may be configured to align the register accesses to produce aligned conflict-free register accesses 242. In one embodiment, the register allocation unit 235 is omitted and the compiler is configured to generate program instructions having conflict-free register accesses 228. In another embodiment, the register allocation unit 235 and the register alignment unit 240 are omitted and the compiler is configured to generate program instructions having aligned conflict-free register accesses. In other words, the register allocation unit 235 and register alignment unit 240 may be configured to perform functions otherwise performed by the compiler 103.

When the register file 224 is directly coupled to a function unit 230, the register alignment unit 240 is configured to produce programs including instructions have aligned input operands. When each operand is aligned to a corresponding register bank, the crossbar switch 205 and the staging registers 207, 208, and 209 of FIG. 2A can be eliminated. As shown in FIG. 2C, three different input operands for an instruction may be read from the register file 224 in a single clock cycle. Each input operand is simultaneously read from bank 221, 222, and 223 and input to input0, input1, and input2, respectively, of the function unit 230.

The problem of generate coding with conflict-free, aligned register accesses necessitates solving a first problem of bank conflicts for accesses registers and a second problem of aligning the register bank storing an operand with the processing unit input that receives the operand. Consider the following instructions for execution in a processor including a multi-bank register file including $N_B$ banks, such as register file 224 with $N_B$=3:
1. MAD R0, R2, R3, R4;
2. MAD R0, R2, R5, R8;

The input operands for instruction 1 (R2, R3, and R4) lie in banks 2, 0 and 1 respectively. Thus, all three can be read in a single cycle. On the other hand, the input operands for instruction 2 (R2, R5, and R8) all lie in bank 2, and trying to access them in a single clock cycle will result in a 3-way bank conflict. Therefore, multiple clock cycles are needed to fetch all of the input operands for instruction 2. The bank conflict may be eliminated by ensuring that input operands for an instruction always lie in different banks of the register file.

Enforcing strict constraints on the instructions, such as allocating registers to non-conflicting banks, can impact both area and performance of a processor, but the constraints may be acceptable if costs outweigh the benefits. Conventional register files maintain exactly one register for each live value in the program. Furthermore, a single physical register is typically time-shared by multiple values with disjoint live ranges. Due to the requirement of having either conflict-free and/or aligned instruction operands, a single value may sometimes need to exist in multiple banks of the register file, causing duplication of registers and consequently an increase in register usage. In a similar manner, if two values with disjoint live ranges are assigned to different banks, those values can no longer occupy the same physical register, causing a further bloat in the register usage. Both duplication and separation of values tend to increase the register usage of a program with conflict-free and/or aligned accesses.

Often, registers may be non-uniformly assigned to different banks, causing an imbalance in the occupancy across banks. Thus, any thread load imbalance will cause physical registers in some banks to remain unused, further adding to the register pressure. Compiler 103 or register allocation unit 225 or 235 may be configured to allocate a continuous sequence of registers to each thread that are interleaved across the available banks.

An increase in register usage due to these three causes—duplication, separation, and load imbalance—can affect both the area and performance of the processor. For the same number of available physical registers, increased register pressure will reduce the thread occupancy and potentially degrade execution throughput. Alternatively, the same performance may be maintained by adding more registers at the cost of additional chip area and power.

Due to duplication of registers, values may need to be copied or moved from one bank to another during program execution. The compiler 103 or register allocation unit 225 or 235 may be configured to add copy operations to the original instruction stream in order to duplicate registers. For instance, to resolve bank conflicts in the following instruction stream, the compiler 103 or register allocation unit 225 or 235 copies register R1 from bank 1 to bank 2, for the following instruction:

MAD R5, R0, R1, R4;

Specifically, the compiler 103 inserts a MOV instruction producing the following change in the program:

MOV R2, R1;
MAD R5, R0, R2, R4;

Naturally, adding extra copy operations tends to increase execution time for the program. However, this performance overhead is expected to be relatively low. This is because copy instructions will often lie in the shadow of long-latency operations (e.g., off-chip memory requests), and can sometimes be coalesced with preceding writes to the source register.

A consequence of eliminating register bank conflicts is the guarantee of single-cycle access to all operands of an instruction. As a direct performance benefit of this transformation, execution cycles that would have originally been wasted waiting for operands that lie in the same bank are now saved.

Furthermore, since all operands can be fetched uniformly in a single cycle, there is no need for staging registers in the input datapath. The staging registers occupy a much larger area than the equivalent storage in the register file, so elimination of the staging registers results in a significant area (and power) savings.

The compiler 103 or register allocation unit 225 or 235 is configured to eliminate bank conflicts during the register allocation stage. The compiler 103 or register allocation unit 225 or 235 may use a standard Chaitin-Briggs-style graph-coloring register allocator. A Chaitin-Briggs register allocator is based on graph coloring on the Register Interference Graph (RIG), which contains nodes representing program values, and edges between simultaneously live values. The allocation algorithm assigns colors to these nodes such that any two nodes sharing an edge are get different colors. Program code is generated by mapping different colors to different physical registers.

However, the Register Interference Graph (RIG) used in Chaitin-Briggs register allocator is based on liveness of values, which is not capable of identifying bank conflicts. Therefore, the compiler 103 or register allocation unit 225 or 235, also maintains a Register Conflict Graph (RCG). The RCG is a subset of the RIG, containing all nodes but edges only between values that appear in the same instruction. Thus, values sharing an edge may be simultaneously requested, and can cause conflicts if placed in the same bank. Performing graph-coloring on the RCG can thus allocate banks such that no instruction triggers a bank conflict.

Figure 3A:
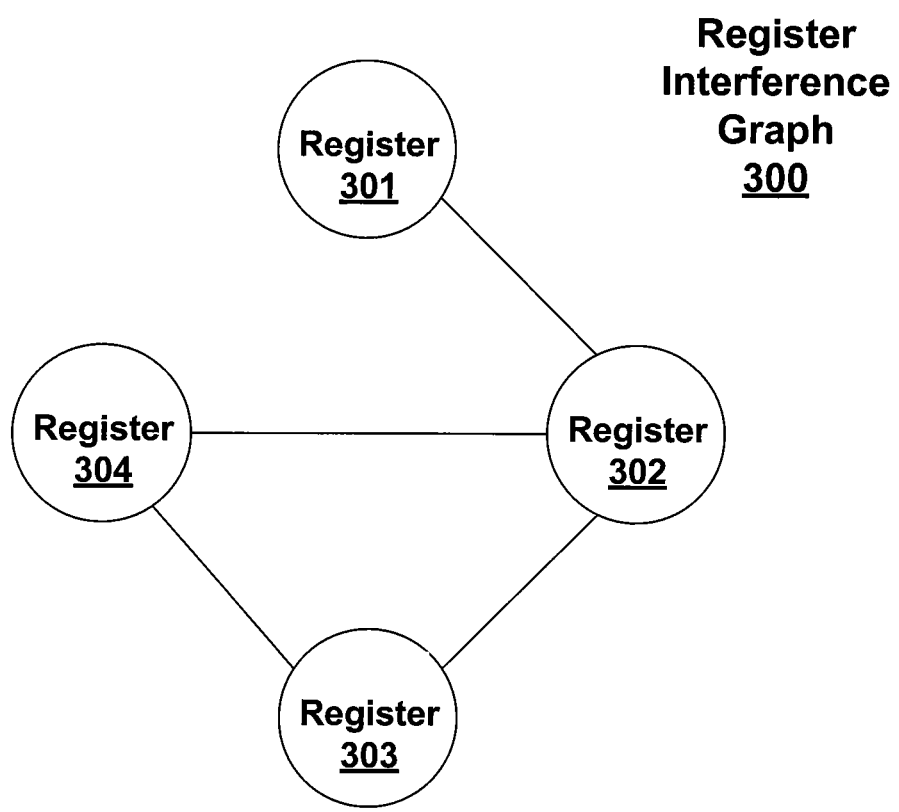
FIG. 3A is a diagram of a Register Interference Graph (RIG), according to one embodiment of the present invention.

FIG. 3A is a diagram of a RIG for an example program shown below in TABLE 1, according to one embodiment of the present invention.

TABLE 1

| Id  | R1, [address]; |
| --- | --- |
| Id  | R2, [address]; |
| add | R3, R2, R1; |
| Id  | R4, [address]; |
| mul | R3, R3, R4; |
| add | R4, R2, R3; |
| st  | [address], R4; |

Register 301, 302, 303, and 304 in FIG. 3A correspond with R1, R2, R3, and R4 in the example program, respectively. The first add instruction in TABLE 1 produces the edges between registers 301 and 302 and registers 302 and 303. Note that there is no edge between R1 and R3 since R2 is consumed at the same time as R3 is generated. Therefore, R1 and R3 may occupy the same physical register. The mul instruction in TABLE 1 produces the edge between registers 303 and 304. The second add instruction in TABLE 1 produces edges between registers 302 and 303, registers 302 and 304, and registers 303 and 304.

Figure 3B:
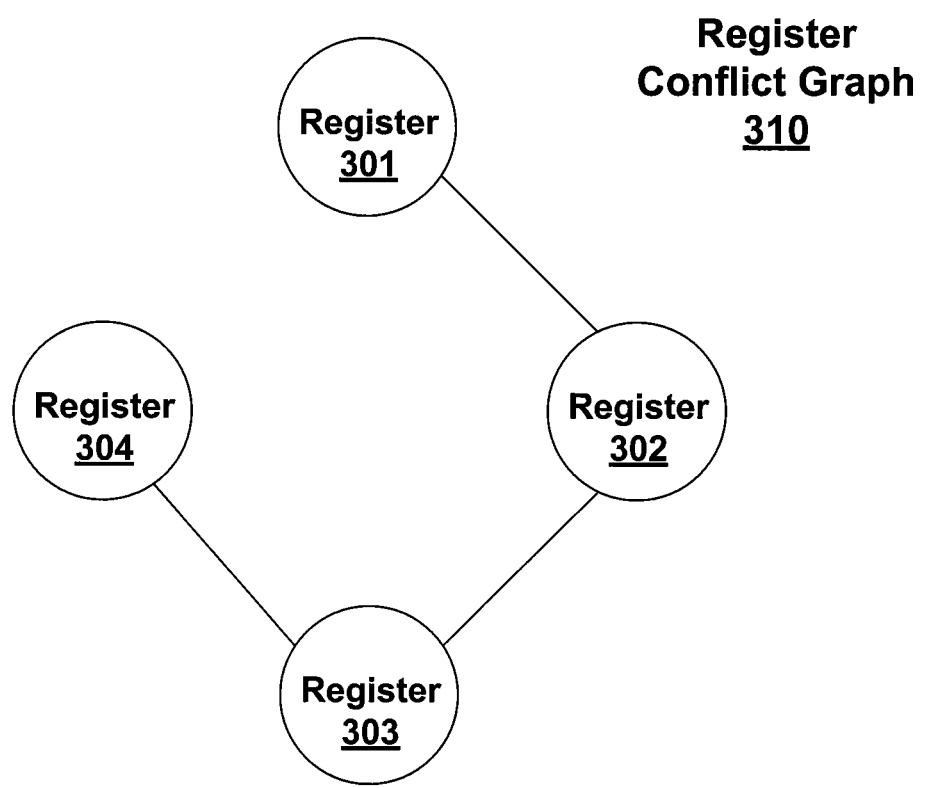
FIG. 3B is a diagram of a Register Conflict Graph (RCG), according to one embodiment of the present invention.

FIG. 3B is a diagram of a RCG for the example program, according to one embodiment of the present invention. While the edges in the RIG shown in FIG. 3A are based on register liveness, the edges in the RCG are based on the simultaneous appearance of values as inputs in the same instruction. The first add instruction in TABLE 1 produces the edge between registers 301 and 302. The mul instruction in TABLE 1 produces the edge between registers 303 and 304. The second add instruction in TABLE 1 produces the edge between registers 302 and 303.

The RCG for a program will not always be colorable with $N_B$ colors, and one or more nodes may need to be split into multiple ones to allow colorability. Such node-splits can be inserted by adding copy operations (MOV instructions) in the program, which may result in performance overheads. Note that coloring the RCG does not ensure operand alignment, but the compiler 103 or register allocation unit 225 or 235 may be configured to prefer banks aligned to operand position during register assignment. When an aligned bank can not be found, more copy operations may need to be added to the program. The compiler 103 is configured to use RCG and RIG of the input program, and find node colors that ensure operands are conflict-free and aligned, while minimizing the extra registers and insertion of copy instructions.

In some embodiments on the compiler 103 or register allocation unit 225 or 235, minimization of register usage is prioritized over reduction in the extra instructions used to eliminate register conflicts since register usage overhead can significantly affect both area and performance, while adding copy operations may not have any major impact on performance.

A straightforward approach to obtaining conflict-free instruction input operands is described in the pseudo-code for a register allocation algorithm shown in TABLE 2. The compiler 103 or register allocation unit 225 or 235 first independently colors the RCG, assigning banks to individual values in the program. Then, it carries out standard register allocation separately for each bank, only considering nodes assigned to that bank. All conflicting nodes get separated prior to actual allocation, so this approach can easily resolve bank conflicts for most programs. Since bank assignment is performed prior to register allocation, the algorithm is referred to as the PreAlloc bank assignment. Unlike conventional register allocation algorithms that are limited to allocation between only two banks, the register allocation algorithm shown in TABLE 2 is configured to allocate registers when a multi-bank register has more than two banks.

Figure 4A:
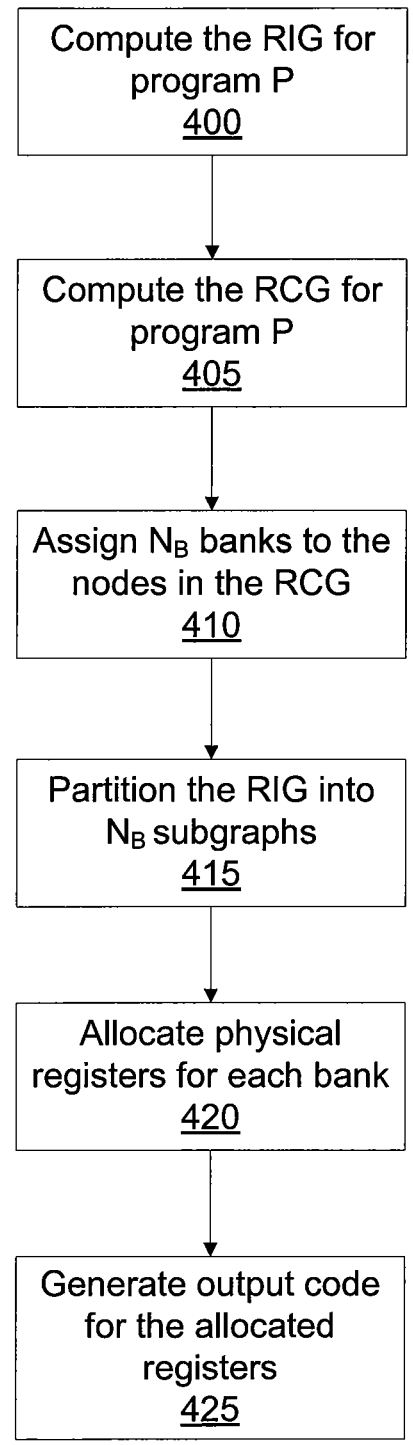
FIG. 4A is a flow diagram of method steps for allocating conflict-free registers, according to one embodiment of the present invention.

TABLE 2 procedure PreAllocResolveConflicts (Program P, $N_B$ banks)
   1: Compute the RCG and RIG for program P
   2: Use Chaitin-Briggs scheme to assign $N_B$ colors (banks) to the nodes in the RCG
   3: Partition the RIG into $N_B$ subgraphs, one for each color
   4: Use Chaitin-Briggs scheme within each subgraph to allocate physical registers for that bank
   5: Generate output code for the allocated registers
end procedure FIG. 4A is a flow diagram of method steps for allocating conflict-free registers using the PreAlloc algorithm, according to one embodiment of the present invention. Although the method steps are described as being performed by the compiler 103, these steps may be performed by register allocation units 225 and 235. At step 400 the compiler 103 computes the RIG for a program P. In some embodiments, the program is represented in a single static assignment (SSA) form. At step 405 the compiler 103 computes the RCG for the program P. At step 410 the compiler 103 assigns $N_B$ banks (colors) to the nodes in the RCG. At step 415 the compiler 103 partitions the RIG into $N_B$ subgraphs, one for each bank of a multi-bank register including at least three banks. At step 420 the compiler 103 allocates physical registers for each bank (subgraph). In some embodiments, the Chaitin-Briggs scheme is used within each subgraph to allocate the physical registers for that bank. At step 425 the compiler 103 generates output code for the allocated registers.

The PreAlloc algorithm is able to identify and eliminate bank conflicts in most programs. However, in some cases the overall register usage is increased since the PreAlloc ignores liveness, so values that may reside in a single physical register get assigned to different banks. In particular, nodes in different banks get allocated to different numbers of physical registers. Thus, there may be an imbalance in the bank usage, which is difficult to control during assignment. A different register allocation may be used by the compiler 103 (or register allocation unit 225 or 235) to circumvent value separation/duplication and load imbalance, by reversing the order of register allocation and bank assignment. Specifically, a PostAlloc algorithm may be used to perform register allocation prior to bank assignment.

When configured to use the PostAlloc register allocation algorithm, the compiler 103 (or register allocation unit 225 or 235) is configured to perform the bank assignment (using graph-coloring) on already-allocated physical registers. Thus, there is no unintended separation of values. Furthermore, the number of nodes assigned to each bank will correspond to the eventual number of physical registers used in that bank, making it easy to maintain load balance across banks. Typically, the compiler 103 (or register allocation unit 225 or 235) generates a lower register overhead when the PostAlloc algorithm is used compared with when the PreAlloc algorithm is used to allocate conflict-free registers.

When the compiler 103 (or register allocation unit 225 or 235) is configured to use the PostAlloc algorithm for bank assignment, computed RCG nodes often correspond to multiple program values. Thus, the average node valence (number of edges per node) is usually higher than when the PreAlloc algorithm is used. This can result in graphs that are uncolorable with $N_B$ banks. In such a scenario, additional register copy operations are inserted into the program to complete the allocation of conflict-free registers, as described in conjunction with FIGS. 5A, 5B, 6A, and 6B. The PostAlloc algorithm for obtaining conflict-free instruction input operands is described in the pseudo-code shown in TABLE 3.

TABLE 3 procedure PostAllocResolveConflicts (Program P, $N_B$ banks)
   1: Compute the RIG for program P
   2: Use Chaitin-Briggs scheme to assign physical registers to RIG nodes
   3: Merge nodes with the same physical register and form a condensed RCG
   4: Use Chaitin-Briggs scheme to assign $N_B$ banks to RCG nodes
   5: Renumber physical registers based on their RCG color
   6: Generate output code for the allocated registers
end procedure To achieve uniform register usage across various banks, the compiler 103 (or register allocation unit 225 or 235) may be configured to heuristically prefer emptier banks during the select phase of graph coloring.

Figure 4B:
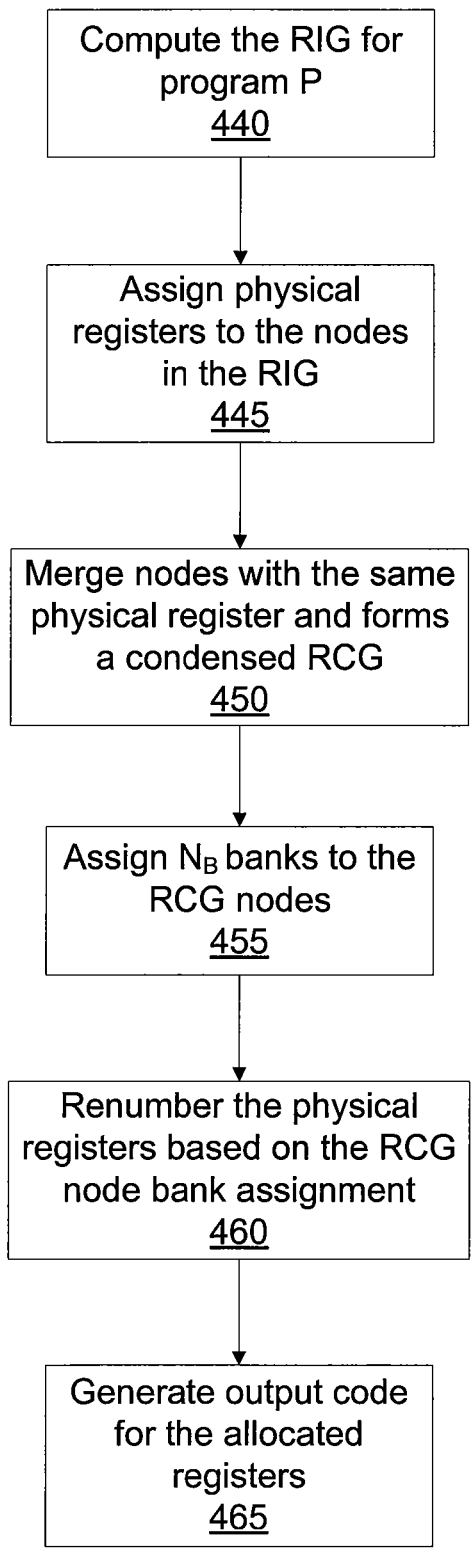
FIG. 4B is another flow diagram of method steps for allocating conflict-free registers, according to one embodiment of the present invention.

FIG. 4B is a flow diagram of method steps for allocating conflict-free registers using the PostAlloc algorithm, according to one embodiment of the present invention. Although the method steps are described as being performed by the compiler 103, these steps may be performed by register allocation units 225 and 235. At step 440 the compiler 103 computes the RIG for a program P. In some embodiments, the program is represented in a single static assignment (SSA) form. At step 445 the compiler 103 assigns physical registers to the nodes in the RIG. In some embodiments, the Chaitin-Briggs scheme is used to assign the physical registers to the RIG nodes. At step 450 the compiler 103 merges nodes in the RIG with the same physical register to form a condensed RCG. A RCG may be generated that represents the physical registers using the condensed RCG. At step 455 the compiler 103 assigns $N_B$ banks (colors) to the nodes in the RCG. In some embodiments, the Chaitin-Briggs scheme is used to assign the colors to the RCG nodes. At step 460 the compiler 103 renumbers the physical registers based on their RCG node $N_B$ bank. At step 465 the compiler 103 generates output code for the allocated registers.

As previously mentioned, graph coloring using the RCG does not always provide a valid conflict-free register allocation. If the computed RCG is too dense, $N_B$ banks may be insufficient to color the nodes, and the assignment procedure might fail. Also, due to varying node valencies, some banks often have very few registers, which can increase the register overhead due to load imbalance. When the graph cannot be colored, nodes may be split by inserting copy instructions into the program.

Figure 5A:
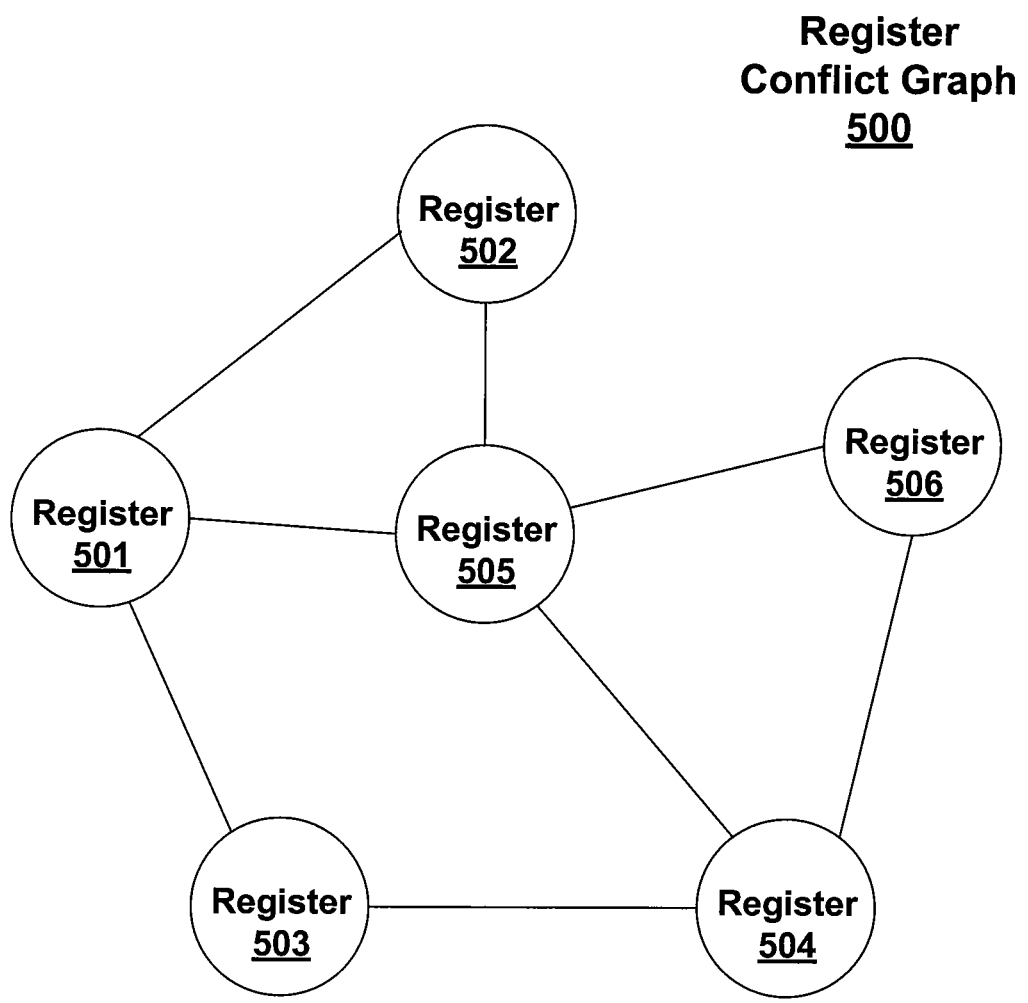
FIG. 5A is a diagram of a RCG requiring a node split, according to one embodiment of the present invention.

FIG. 5A is a conceptual diagram of a RCG 500 requiring a node split, according to one embodiment of the present invention. Each node is assigned a register and the register 505 conflicts with all other nodes, e.g., registers 501, 502, 503, 504, and 506. Register 505 may be the only occupant in a particular bank and this imbalance may increase register usage. Register 505 may be split to reduce the register overhead for the program.

Figure 5B:
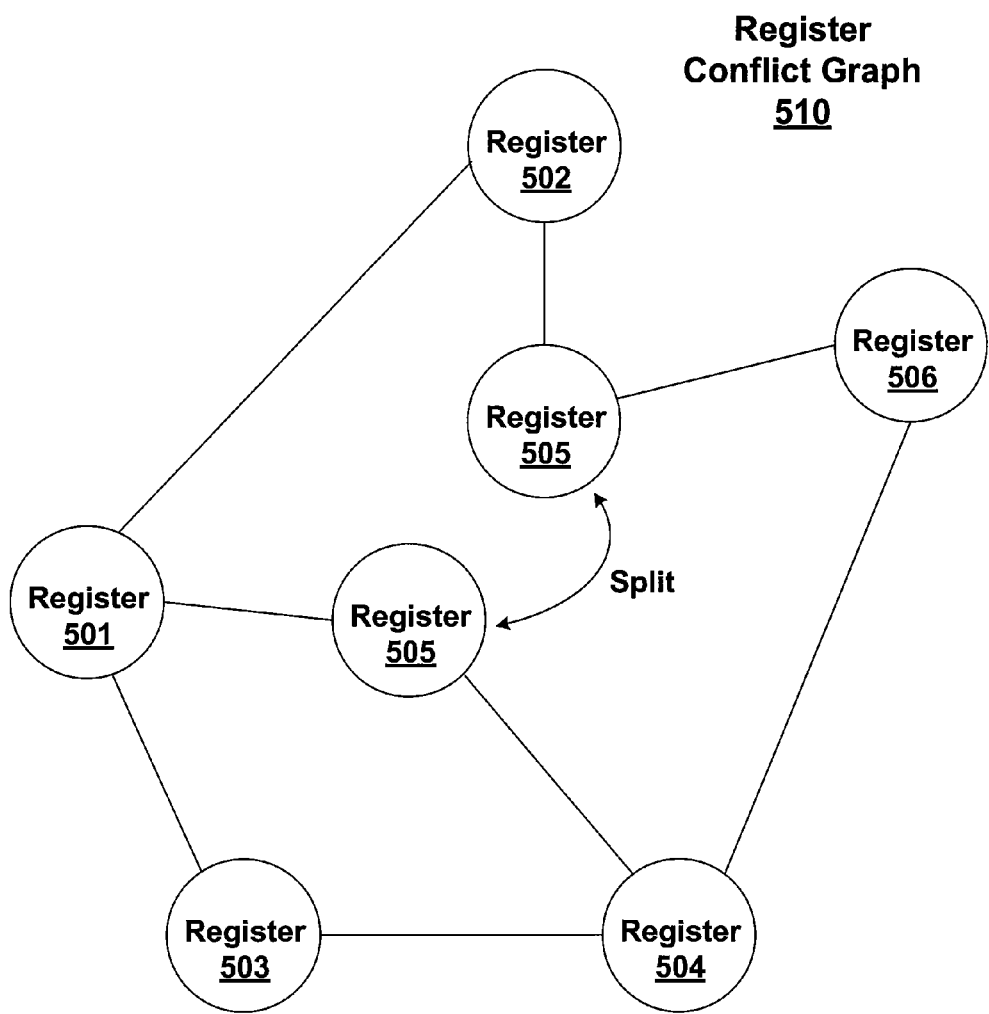
FIG. 5B is a diagram of the RCG of FIG. 5A after a node is split, according to one embodiment of the present invention.

FIG. 5B is a conceptual diagram of the RCG of FIG. 5A after a node is split, according to one embodiment of the present invention. Splitting of the register 505 produces the RCG 510 shown in FIG. 5B. Unlike the RCG 500, the RCG 510 is amenable to efficient bank assignment. Node-splits are carried out by inserting MOV instructions in the program to copy a register from one bank to another. For example, in order to split a register R2 in the instruction ADD R1, R2, R3 the register R2 is copied to R7 and subsequent instructions reference the copy of R2. ADD R1, R2, R3 is replaced with:

MOV R7, R2;
ADD R1, R7, R3;

The compiler 103 (or register allocation unit 225 or 235) may be configured to split nodes during register allocation to perform conflict-free register allocation. The compiler 103 (or register allocation unit 225 or 235) begins by choosing the set of nodes that need to be split. For bank assignments that fail, the set contains nodes that had no available bank during graph coloring. In case of load imbalance, the compiler 103 (or register allocation unit 225 or 235) uses a heuristic that incrementally selects the node with the highest valence in the least occupied bank. In other words, while the bank load is not balanced, one node is selected (the node having the highest valence for the least occupied bank) and the one node is split. The selection and splitting is repeated for another node as long as the banks load is not balanced.

The live range of the nodes in the set is partitioned by inserting a copy operation after every use. Splitting the nodes in this fashion divides a single live range into multiple smaller ones, and allows each copy is a different node of smaller valence. The compiler 103 (or register allocation unit 225 or 235) then repeats the allocation procedure on the new graph to produce a better result. The algorithm for splitting nodes to produce conflict-free instruction input operands is referred to as the Split-And-Reassign algorithm that described in the pseudo-code shown in TABLE 4.

Figure 6A:
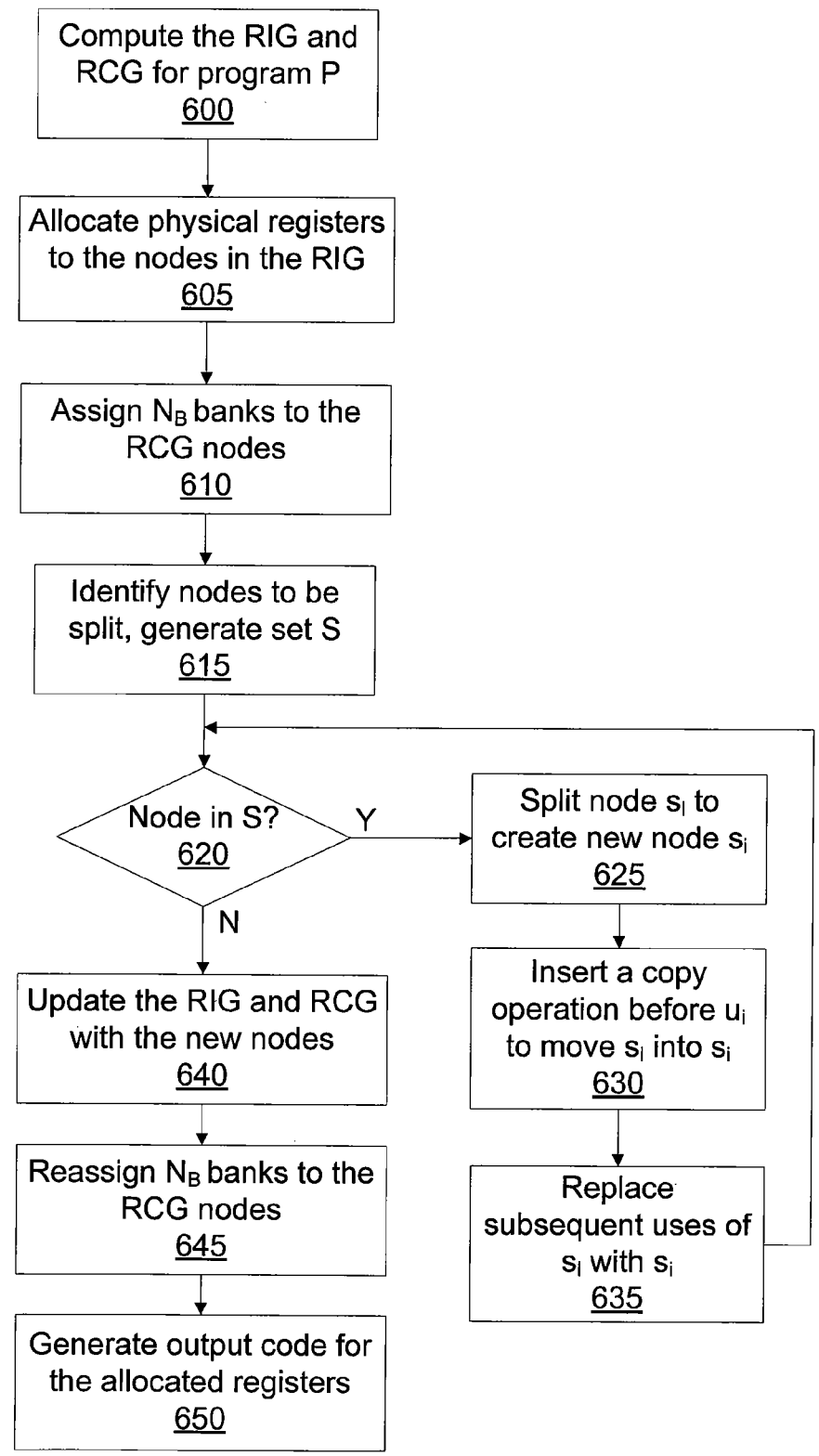
FIG. 6A is a flow diagram of method steps for allocating conflict-free registers by splitting nodes, according to one embodiment of the present invention.

TABLE 4 procedure SplitAndReassign (Program P, RCG, RIG, $N_B$ banks)
1: Identify nodes to be split and place them in a set
2: FORALL all nodes s in S do
3:    FORALL instructions $u_i$ in P that use s
4:       Let $s_l$ be the currently live version of s
5:       Create a new node $s_i$
6:       Insert a copy operation before $u_i$ to move $s_l$ into $s_i$
7:       Replace subsequent uses of $s_l$ with $s_i$
8:    ENDFOR
9: ENDFOR
10: Update RIG and RCG with the new nodes
11: Repeat bank assignment
end procedure FIG. 6A is a flow diagram of method steps for allocating conflict-free registers by splitting nodes using the Split-And-Reassign algorithm, according to one embodiment of the present invention. Although the method steps are described as being performed by the compiler 103, these steps may be performed by register allocation units 225 and 235. At step 600 the compiler 103 computes the RIG and RCG for the program P. At step 605 the compiler 103 assigns physical registers to the nodes in the RIG. At step 610 the compiler 103 assigns $N_B$ banks to the RCG nodes. At step 615 the compiler 103 identifies nodes to be split and generates a set, S, of the nodes to be split.

At step 620 the compiler 103 determines if there is a node to be split in set S, and, if so, then at step 625 the compiler 103 splits node $s_l$ (the currently live version of the node to be split) to create a new node, $s_i$. At step 630 the compiler 103 inserts a copy operation before the instruction $u_i$ that references node $s_l$. The copy operation moves $s_l$ into $s_i$. At step 635 the compiler 103 replaces subsequent references of $s_l$ in instructions with $s_i$. After completing step 635, the compiler 103 returns to step 620 to copy any other nodes in the set S.

If, at step 620 the compiler 103 determines if there is not a node to be split in set S, then at step 640 the compiler 103 updates the RIG and RCG with the new nodes. At step 645 the compiler 103 reassigns $N_B$ banks to the RCG nodes. At step 650 the compiler 103 generates the output code for the allocated registers.

When configured to perform the Split-And-Reassign algorithm the compiler 103 (or register allocation unit 225 or 235) is able to allocate conflict-free registers for most cases with uncolorable graphs or imbalanced assignment. Additionally, the register overhead introduced as a result of the register splits is low. However, for some inputs, the approach may fail to find good results, even after several allocation passes when used in conjunction with the PostAlloc algorithm for basic assignment. The PostAlloc algorithm performs register allocation first, which tends to coalesce graph nodes, often reversing the effect of node-splits. Despite our efforts to avoid coalescing specific nodes, we were not able to obtain satisfactory results for all cases.

A single-pass algorithm may be used to split a live range at a few selected points, and update the RIG and RCG on-the-fly. This other algorithm for splitting nodes to produce conflict-free instruction input operands is referred to as the Selective-Split algorithm. When configured to use the Selective-Split algorithm, the compiler 103 (or register allocation unit 225 or 235) iterates over all nodes selected for splitting, and for each node, the compiler 103 (or register allocation unit 225 or 235) (or register allocation unit 225 or 235) uses a heuristic to pre-assign the node to a bank. In one embodiment the least occupied bank is selected for assignment to the node. Then, the compiler 103 (or register allocation unit 225 or 235) selectively splits the node such that the node has no conflicts in the chosen bank. This is achieved by inserting copy operations only for instructions that cause conflicts in the bank, and placing new nodes into another bank chosen using the same heuristic. Using this approach, all conflicts are resolved in a single pass without inserting too many extra copy operations.

The Selective-Split algorithm is described in the pseudo-code shown in TABLE 5.

Figure 6B:
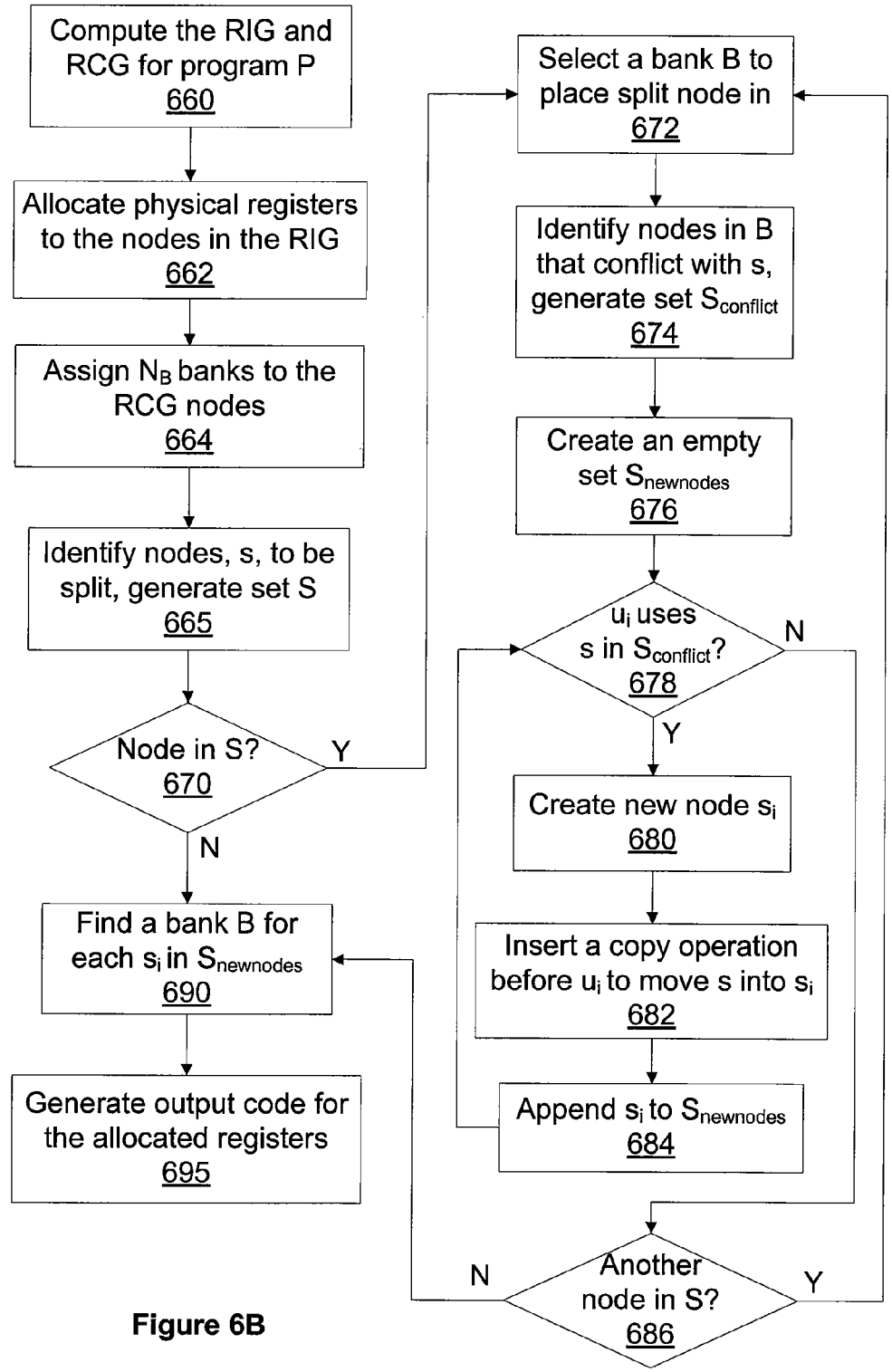
FIG. 6B is another flow diagram of method steps for allocating conflict-free registers by splitting nodes, according to one embodiment of the present invention.

TABLE 5 procedure SelectiveSplit (Program P, RCG, RIG, NB banks)
1: Identify nodes to be split and place them in a set S
2: FORALL s in S
3:    Select a bank B to place s in, using an appropriate heuristic
4:    Identify nodes in B that share conflict edge with s, and
      place them in a set S
5:    Create an empty set Snewnodes
6:    FORALL {instructions ui in P that use s
7:       IF ui uses any node in Sconflict
8:          Create a new node si
9:          Insert a copy instruction before ui to move s into
            si
10:         Append si to Snewnodes
11:      ENDIF
12:   ENDFOR
13: ENDFOR
14: FORALL si in Snewnodes
15: Find a bank B for si using the same heuristic as above
16: ENDFOR
end procedure FIG. 6B is another flow diagram of method steps for allocating conflict-free registers by splitting nodes using the Selective-Split algorithm, according to one embodiment of the present invention. Although the method steps are described as being performed by the compiler 103, these steps may be performed by register allocation units 225 and 235. At step 660 the compiler 103 computes the RIG and RCG for the program P. At step 662 the compiler 103 allocates physical registers to the nodes in the RIG. At step 664 the compiler 103 assigns $N_B$ banks to the RCG nodes. At step 665 the compiler 103 identifies nodes, s, to be split and generates a set, S, of the nodes to be split.

At step 670 the compiler 103 determines if there is a node s to be split in set S, and, if not, then the compiler 103 proceeds directly to step 690. Otherwise, at step 672 the compiler 103 selects a bank B to place the split node in. In one embodiment, the compiler 103 places the split node into the least occupied bank. At step 674 the compiler 103 identifies nodes in bank B that share a conflict edge of the RCG with node s and generates the set of nodes $S_{conflict}$ that includes the nodes in bank B that conflict with node s. At step 676 the compiler 103 creates an empty set, $S_{newnodes}$. At step 678 the compiler 103 determines if any instruction, $u_i$, in the program that uses the node s also uses any node in $S_{conflict}$. If there are no instructions that use the node s and that also use a node in $S_{conflict}$, then the compiler proceeds directly to step 686 to split another node in the set S.

If, at step 678 the compiler 103 determines that an instruction, $u_i$, in the program that uses the node s also uses a node in $S_{conflict}$, then at step 680 the compiler 103 splits node s by creating a new node $s_i$. At step 682 the compiler 103 inserts a copy operation before $u_i$ to move s into $s_i$. At step 684 the compiler 103 appends $s_i$ to $S_{newnodes}$ and returns to step 678 to split node s for any additional instructions $u_i$. If, at step 678, the compiler 103 determines that there are no more instructions in the program that use the node s also use a node in $S_{conflict}$, then the compiler proceeds to step 686 to split another node in the set S.

At step 686 the compiler 103 determines if there is another node s in set S to be split, and, if so the compiler 103 returns to step 672 to split another node in the set S. When no more nodes need to be split, then at step 690 the compiler 103 finds a bank B for each $s_i$ in $S_{newnodes}$. In one embodiment, the compiler 103 places the split node into the least occupied bank. At step 695 the compiler 103 generates the output code for the allocated registers. The output code that is produced uses the conflict-free allocated registers, allowing the elimination of the staging registers. The input operands for each instruction may be obtained from the different register banks in a single clock cycle, so multiple clock cycles are no needed to read two or more operands from a single register bank.

FIGS. 7A, 7B, 7C, and 7D illustrate using the method described in conjunction with FIG. 6B to produce allocate conflict-free registers for sequence of instructions shown in TABLE 6.

TABLE 6

| | |
|---|---|
| load | r1 |
| load | r2; |
| load | r6; |
| mad | r3, r1, r2, r6; |
| add | r4, r1, r3; |
| add | r5, r2, r4; |
| mad | r5, r3, r4, r5; |
| store | r5 |

The sequence of instruction shown in TABLE 6 is first converted to SSA form and is shown in TABLE 7. Note that instead of using r5 to store the output of the second mad instruction, r7 is used.

TABLE 7

| | |
|---|---|
| load | r1 |
| load | r2; |
| load | r6; |
| mad | r3, r1, r2, r6; |
| add | r4, r1, r3; |
| add | r5, r2, r4; |
| mad | r7, r3, r4, r5; |
| store | r7 |

Figure 7A:
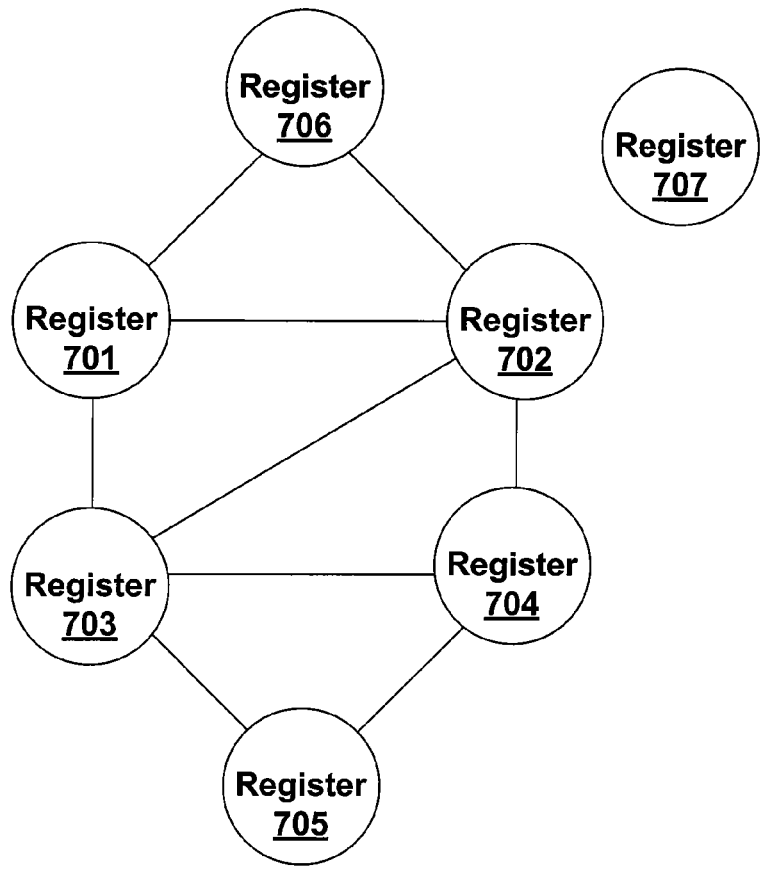
FIG. 7A is a diagram of a RIG, according to one embodiment of the present invention.

A RIG is generated for the sequence of instructions shown in TABLE 7. FIG. 7A is a diagram of the RIG for the sequence of instructions shown in TABLE 7, according to one embodiment of the present invention. Physical registers r1 through r7 in TABLE 7 correspond with registers 701 through 707 in FIG. 7A. The first mad instruction in the sequence of instructions produces the edges between registers 701, 702, and 706. The first add instruction in the sequence of instructions produces the edge between registers 701 and 703. The second add instruction in the sequence of instructions produces the edge between registers 702 and 704.

Figure 7B:
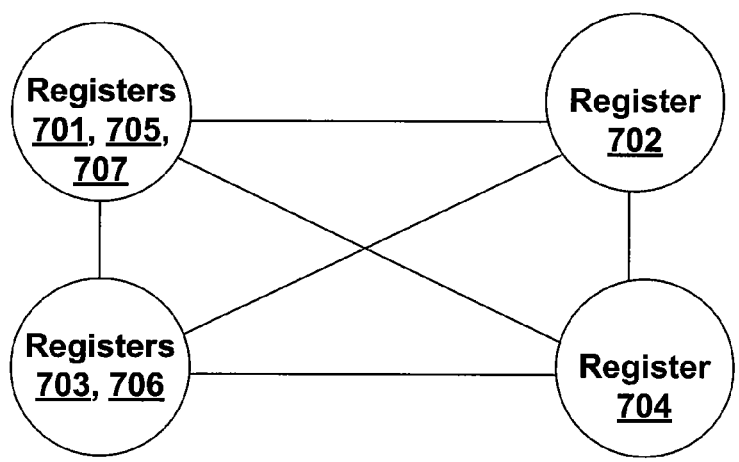
FIG. 7B is a diagram of the RIG shown in FIG. 7A and corresponding RCG with physical registers allocated, according to one embodiment of the present invention.

FIG. 7B is a diagram of the RIG shown in FIG. 7A and corresponding RCG with physical registers r1 through r7 allocated, according to one embodiment of the present invention. Note, that for this example, the RCG is the same as the RIG. Registers 701, 705, and 707 are grouped together and registers 703 and 706 are grouped together.

Figure 7C:
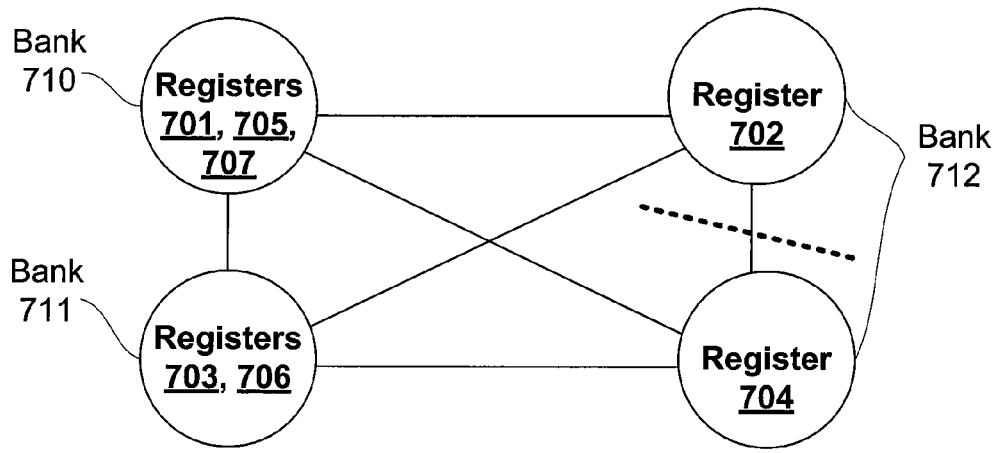
FIG. 7C is a diagram of the RCG shown in FIG. 7B that requires a node split, according to one embodiment of the present invention.

FIG. 7C is a diagram of the RCG shown in FIG. 7B showing the bank assignments of the registers, according to one embodiment of the present invention. As shown in FIG. 7C, registers 701, 705, and 707 are assigned to bank 710, registers 703 and 706 are assigned to bank 711, and both of registers 702 and 704 are assigned to bank 712. Because there are only three banks, one of the registers, either 702 or 704 must be split to remove the bank conflict.

Figure 7D:
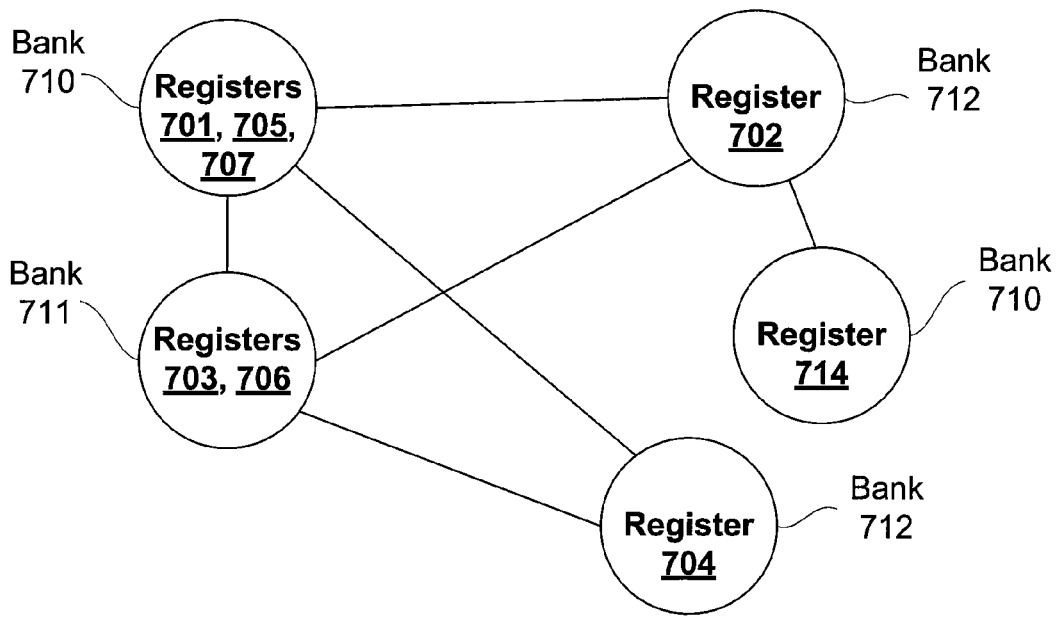
FIG. 7D is a diagram of the RCG shown in FIG. 7C with a split node, according to one embodiment of the present invention.

FIG. 7D is a diagram of the RCG shown in FIG. 7C with a split node (register 704), according to one embodiment of the present invention. Register 704 is split, thereby allocating register 714. Register 704 remains assigned to bank 712 and the new allocation, register 714 is assigned to bank 710.

The sequence of instruction shown in TABLE 7 is modified by inserting a copy operation (mov) to allocate register 714 (r14) as shown in TABLE 8.

TABLE 8

| | |
|---|---|
| load | r1 |
| load | r2; |
| load | r6; |
| mad | r3, r1, r2, r6; |
| add | r4, r1, r3; |
| mov | r14, r4; |
| add | r5, r2, r14; |
| mad | r7, r3, r4, r5; |
| store | r7 |

Allocating registers to non-conflicting banks using the techniques shown in FIG. 4A, 4B, 6A, or 6B produces a sequence of instructions or program with non-conflicting registers that can reduce the circuit area of a processor. In order to eliminate all bank conflicts, a single value may sometimes need to exist in multiple banks of the register file, as shown in FIGS. 6A and 6B. Although the number of registers needed for the allocation may increase when registers are split, all of the input operands may be provided to a function unit in a single cycle, eliminating the need for the staging registers and multi-cycle delays to provide the input operands.

Allocation of Aligned Registers

Alignment of the instruction operands so that each register file bank outputs an input operand directly to an input of a function unit allow for elimination of the crossbar switch. In some embodiments, the input operands are partially aligned so that a reduced crossbar switch may be used. For example, a reduced crossbar switch may allow for the routing of two different banks to a single input of a function unit. Alignment may be performed in addition to the allocation of conflict-free registers or alignment may be performed independently. When alignment is performed without the removal of any register conflicts, the crossbar switch may be eliminated while the staging registers are retained. Elimination or reduction of the crossbar switch reduces the circuitry area and power requirements of the processor.

The sequence of instructions shown in TABLE 9 has no bank conflicts, assuming that r0 and r3 are in a first bank, r1 and r7 are in a second bank, and r2 and r5 are in a third bank, but the crossbar switch is still needed to route individual input operands to ports of the function unit.

TABLE 9

| | |
|---|---|
| mad | r0, r1, r2, r3; |
| mad | r0, r2, r3, r7; |
| mad | r0, r3, r1, r5; |

For the first two instructions, the banks are not aligned to the corresponding function unit input ports. The first mad instruction requests registers from banks 1, 2, and 0 for the input operands, while the second mad instruction requests from banks 2, 0, and 1 for the input operands. The third mad instruction requests banks in order, i.e., banks 0, 1 and 2. Thus, the instruction operands should be aligned to their respective banks for the first two mad instructions. Note that the alignment problem is a superset of the bank conflict program, because aligned operands must lie in different banks.

Compared to resolving bank conflicts, aligning input operands is a more difficult problem. The input operands often appear at different positions at different points in the program, and the input operands and banks must be aligned at all corresponding instructions. Clearly, the chance of values separation and duplication is significantly higher, and is expected to translate into undesirable register and instruction overhead. The situation is exacerbated because of load imbalance. However, for input operands with multiple uses, the operand positions in instructions are often well-correlated from one instruction to the next. Moreover, several instructions (e.g., add, mul) are commutative, making it easier to align operands by simply swapping their positions in the instruction.

When an operand appears at multiple positions in an instruction, the operand may reside in a bank aligned with any of the positions since the function unit is assumed to be configured to internally reuse the fetched value, reducing undesirable duplication of values. Additionally, copy operations, i.e. MOV instructions, are exempt from alignment constraints. Thus, the any register bank may be used as operand for a MOV instruction.

The algorithm for aligning register bank allocation to produce aligned instruction input operands is referred to as the AlignOps algorithm that is described in the pseudo-code shown in TABLE 10.

TABLE 10 procedure AlignOps (Program P, $N_B$ banks)
    1: Perform PostAlloc bank assignment for P. For each node, prefer
       an aligned bank during selection.
    2: Perform Selective-Split to insert copy operations, if needed.
       Prefer aligned banks for new nodes.
    3: FORALL instructions I in P
    4:   FORALL input operands $o_i$ of I
    5:     if $o_i$ does not lie in an aligned bank then
    6:       Create a new node $o_{aligned}$ and place it in an
           aligned bank
    7:       Insert a copy operation before I to copy $o_i$ to
           $o_{aligned}$
    8:     ENDIF
    9:   ENDFOR
   10: ENDFOR
   11: Generate output code for the allocated registers
end procedure The AlignOps algorithm builds on the approach previously described for resolving bank conflicts, except that the bank assignment and node splitting heuristics are modified to prefer aligned banks for each node. Since this may not guarantee complete alignment, a final pass may be performed over allocated registers to identify operands that could not be aligned and copy operations are inserted to align those operands.

Figure 8A:
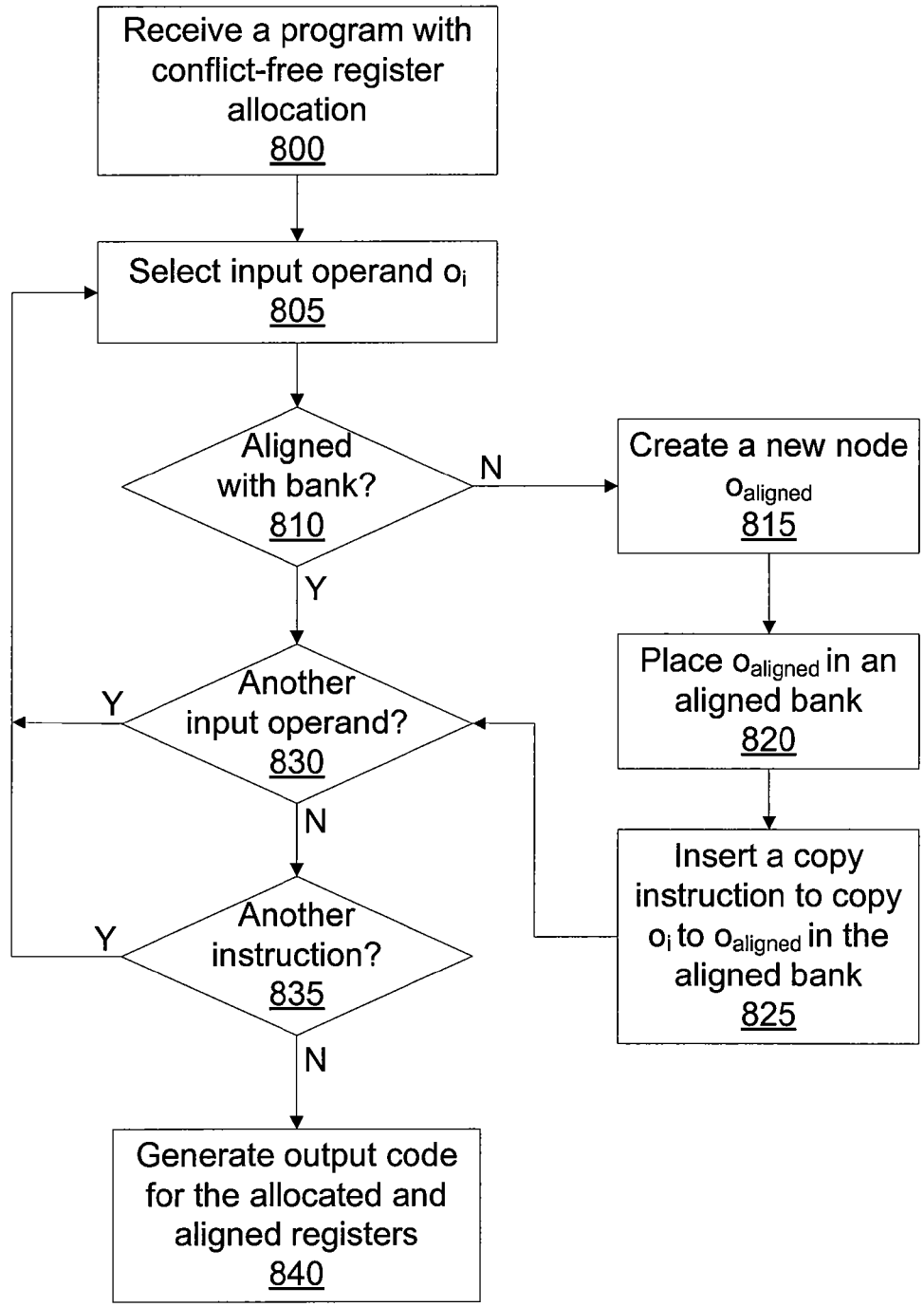
FIG. 8A is a flow diagram of method steps for allocating aligned registers, according to one embodiment of the present invention.

FIG. 8A is a flow diagram of method steps for allocating aligned registers, according to one embodiment of the present invention. At step 800 a sequence of instructions (or an entire program) is received having a conflict-free register allocation. The conflict-free registers may be allocated using any technique, including, but not limited to the techniques described in conjunction with FIG. 4A, 4B, 6A, or 6B. Although the method steps are described as being performed by the compiler 103, these steps may be performed by register allocation units 225 and 235 and/or register alignment unit 240. At step 805 an input operand, $o_i$, that is specified for an instruction is selected by the compiler 103. At step 810 the compiler 103 determines if $o_i$ is aligned with the bank containing the register that is allocated to store $o_i$. In other words, the compiler 103 determines if the bank is coupled to the input of the function unit that needs to receive the input operand. In one embodiment that does not include a crossbar switch, the bank should be directly coupled only to the input of the function unit that needs to receive the input operand. In another embodiment that includes a partial crossbar switch, the bank may be indirectly coupled through the crossbar switch to two or more, but not all, inputs of the function unit.

If, at step 810 the compiler 103 determines that $o_i$ is aligned with the bank containing the register that is allocated to store $o_i$, then the compiler proceeds directly to step 830. Otherwise, at step 815 the compiler 103 creates a new node, $o_{aligned}$, in the RCG that represents the program (or sequence of instructions). At step 820 the compiler 103 places $o_{aligned}$ into an aligned bank. At step 825 the compiler 103 inserts a copy instruction before the instruction that specifies $o_i$ to copy $o_{aligned}$ to $o_{aligned}$ and proceeds to step 830.

At step 830 the compiler 103 determines if another input operand is specified for the instruction, and, if so, the compiler returns to step 805. Otherwise, at step 835 the compiler 103 determines if there is another instruction in the program (or sequence of instruction). If, at step 835 the compiler 103 determines that there is another instruction, then the compiler 103 returns to step 805. Otherwise, at step 840 the compiler 103 generates the output code for the aligned registers that are also allocated without bank conflicts.

The sequence of instructions shown in TABLE 11 includes instructions that are not aligned. In particular R2 for the first add instruction, R1 and R0 in the second add instruction, and R2 and R0 in the second mad instruction are not aligned from the bank to the input of the function unit, assuming that the register file includes three banks and R0 is in the first bank, R1 is in the second bank, and R2 is in the third bank.

TABLE 11

| load  | r0             |
|-------|----------------|
| load  | r1;            |
| load  | r2;            |
| mad   | r2, r0, r1, r2; |
| add   | r1, r0, r2;    |
| mov   | r0, r1;        |
| add   | r0, r1, r0;    |
| mad   | r0, r2, r1, r0; |
| store | r0             |

The sequence of instructions shown in TABLE 12 is the aligned instructions corresponding to the sequence of instructions shown in TABLE 11. A mov instruction is inserted before the first add instruction to copy r2 to r1, allowing r1 to replace r2 in the first add instruction. The inputs to the second add instruction are swapped to align those registers. Second and third mov instructions are inserted before the second mad instruction to copy r2 to r3 and r0 to r2, allowing the mad instruction to have aligned input operands r3, r1, and r2.

TABLE 12

| load  | r0             |
|-------|----------------|
| load  | r1;            |
| load  | r2;            |
| mad   | r2, r0, r1, r2; |
| mov   | r1, r2;        |
| add   | r1, r0, r1;    |
| mov   | r0, r1;        |
| add   | r0, r0, r1;    |
| mov   | r3, r2;        |
| mov   | r2, r0;        |
| mad   | r0, r3, r1, r2; |
| store | r0             |

While complete operand alignment is desirable for eliminating the crossbar switch, it is possible to obtain area savings without aligning all operand positions. This can be achieved by replacing the full crossbar switch with a sparse crossbar switch that only connects a subset of register file banks to a subset of function unit input ports. Thus, while each instruction operand must lie in the subset that contains the corresponding function unit input port, the bank does not need to be aligned.

Figure 8B:
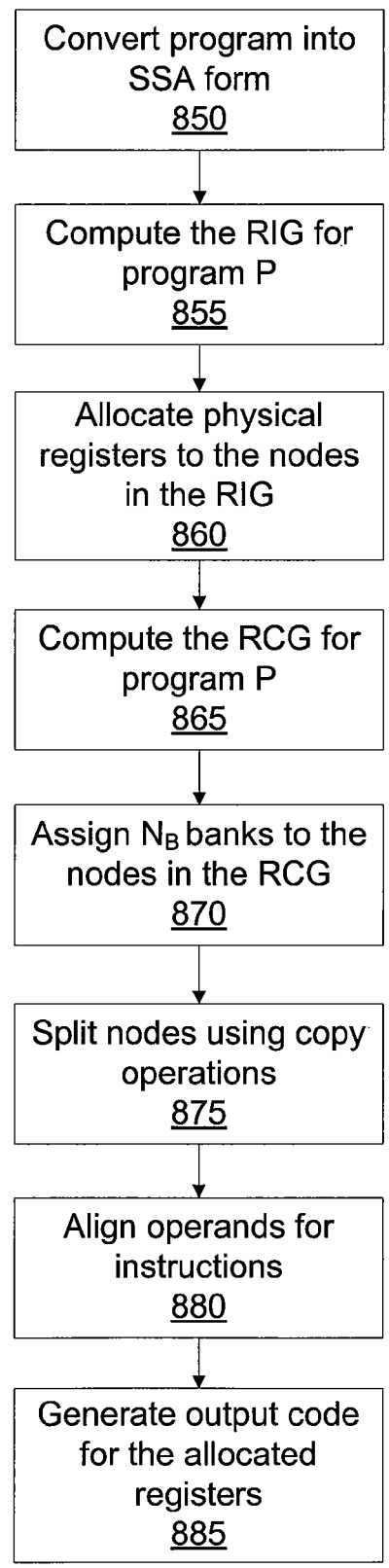
FIG. 8B is a flow diagram of method steps for allocating conflict-free and aligned registers, according to one embodiment of the present invention.

FIG. 8B is a flow diagram of method steps for allocating aligned and conflict-free registers, according to one embodiment of the present invention. As shown in FIG. 8B, the PostAlloc bank assignment technique is used with the Selective-Split register splitting and the AlignOps register bank alignment techniques. At step 850 the compiler 103 converts a program into an SSA form. At step 855 the compiler 103 computes a RIG for the program in the SSA form. At step 860 the compiler 103 allocates physical registers to the nodes in the RIG. At step 865 the compiler 103 computes the RCG for the program in the SSA form. At step 870 the compiler 103 assigns $N_B$ banks to the nodes in the RCG. At step 875 the compiler splits nodes as needed to eliminate bank conflicts using copy operations. At step 880 the compiler 103 aligns operands for instructions. At step 885 the compiler 103 generates output code corresponding to the program for the allocated non-conflicting registers that are also aligned.

Alignment may be performed in addition to the allocation of conflict-free registers. Elimination or reduction of the crossbar switch reduces the circuitry area and power requirements of the processor. Additionally, aligned registers may be allocated during the splitting of nodes to remove bank conflicts.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read-only memory (CD-ROM) disks readable by a CD-ROM drive, flash memory, read-only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for assigning variables to physical registers stored in a multi-bank register file, comprising:
    computing a Register Conflict Graph (RCG) for an input program that includes variables represented as nodes in the RCG;
    assigning at least three banks of the multi-bank register file to the nodes in the RCG;
    allocating physical registers for each of the at least three banks enabling input operands to be read from the multi-bank register file in a single access cycle for each instruction that specifies the input operands to produce a conflict-free register allocation, wherein a first physical register of the physical registers is allocated to a first bank of the multi-bank registers file and is configured to store a first operand to be received at a first input of a function unit configured to perform an operation specified by the instruction;
    determining that the first bank of the multi-bank register file is not coupled to the first input of the function unit;
    inserting a copy instruction to align the first operand to a second bank of the multi-bank register file, the second bank being coupled to the first input of the function unit; and
    generating an output program corresponding to the input program that uses the conflict-free register allocation.

2. The method of claim 1, further comprising computing a Register Interference Graph (RIG) for the input program that includes the variables represented as nodes in the RIG.

3. The method of claim 2, further comprising assigning the physical registers stored in the multi-bank register file to the nodes in the RIG.

4. The method of claim 3, further comprising merging nodes in the RIG that are assigned to the same physical register to form the RCG.

5. The method of claim 1, wherein the step of allocating the physical registers comprises renumbering the physical registers based on the assigning of the at least three banks of the multi-bank register file to produce the conflict-free register allocation.

6. A non-transitory computer-readable storage medium storing instructions that, when executed by a processor, cause the processor to assign variables to physical registers stored in a multi-bank register file, by performing the steps of:
computing a Register Conflict Graph (RCG) for an input program that includes variables represented as nodes in the RCG;
assigning at least three banks of the multi-bank register file to the nodes in the RCG;
allocating physical registers for each of the at least three banks enabling input operands to be read from the multi-bank register file in a single access cycle for each instruction that specifies the input operands to produce a conflict-free register allocation, wherein a first physical register of the physical registers is allocated to a first bank of the multi-bank registers file and is configured to store a first operand to be received at a first input of a function unit configured to perform an operation specified by the instruction;
determining that the first bank of the multi-bank register file is not coupled to the first input of the function unit;
inserting a copy instruction to align the first operand to a second bank of the multi-bank register file, the second bank being coupled to the first input of the function unit; and
generating an output program corresponding to the input program that uses the conflict-free register allocation.

7. A system for assigning variables to physical registers stored in a multi-bank register file, the system comprising:
the multi-bank register file including at least three different banks that are configured to parallel access in a single access cycle;
a function unit that is configured to receive input operands read from the multi-bank register file and execute program instructions that specify the input operands; and
a register allocation unit that is directly coupled to the multi-bank register file and configured to:
compute a Register Conflict Graph (RCG) for an input program that includes variables represented as nodes in the RCG;
assign the at least three banks of the multi-bank register file to the nodes in the RCG;
allocate the physical registers for each of the at least three banks so that the variables used as input operands each single instruction are stored in different banks of the at least three banks to produce a conflict-free register allocation; and
generate an output program corresponding to the input program that uses the conflict-free register allocation for execution by the function unit.

8. The system of claim 7, wherein the register allocation unit is further configured to compute a Register Interference Graph (RIG) for the input program that includes the variables represented as nodes in the RIG.

9. The system of claim 8, wherein the register allocation unit is further configured to assign the physical registers stored in the multi-bank register file to the nodes in the RIG.

10. The system of claim 9, wherein the register allocation unit is further configured to merge nodes in the RIG that are assigned to the same physical register to form the RCG.

11. The system of claim 7, wherein the wherein the register allocation unit is further configured to renumber the physical registers based on the assigning of the at least three banks of the multi-bank register file to produce the conflict-free register allocation.

12. A method for assigning variables to physical registers stored in a multi-bank register file, comprising:
computing a Register Interference Graph (RIG) for an input program that includes variables represented as nodes in the RIG;
allocating the physical registers stored in the multi-bank register file to the nodes in the RIG;
computing a Register Conflict Graph (RCG) for the input program that includes the variables represented as nodes in the RCG and uses the physical registers allocated to the nodes in the RIG;
assigning a bank of the multi-bank register file to each node in the RCG;
splitting a node in the RCG into the node and a copy node to enable input operands to be read from the multi-bank register file in a single access cycle for each instruction that specifies the input operands to produce a conflict-free register allocation, wherein a first bank of the multi-bank register file is coupled to a first input of a function unit and is not coupled to a second input of the function unit and a second bank of the multi-bank register file is coupled to the second input of the function unit and is not coupled to the first input of the function unit; and
generating an output program corresponding to the input program that uses the conflict-free register allocation.

13. The method of claim 12, further comprising the steps of:
selecting the first bank in the multi-bank register file to assign the copy node to; and
identifying any other nodes in the first bank that conflict with the copy node.

14. The method of claim 12, wherein the step of splitting comprises inserting a copy operation before an instruction in the input program that uses the node to copy the contents of a first physical register allocated to the node from the first bank to the second bank of the multi-bank register file to produce the copy node, wherein the copy node is allocated to a second physical register.

15. The method of claim 14, further comprising replacing subsequent uses of the first physical register in the input program with the second physical register.

16. The method of claim 14, further comprising selecting the second bank when the second bank is less used compared with another bank of the multi-bank register file.

17. The method of claim 14, wherein the second input of the function unit receives a variable stored in the second physical register as an input operand for the instruction in the input program.

18. A non-transitory computer-readable storage medium storing instructions that, when executed by a processor, cause the processor to assign variables to physical registers stored in a multi-bank register file, by performing the steps of:
computing a Register Interference Graph (RIG) for an input program that includes variables represented as nodes in the RIG;
allocating the physical registers stored in the multi-bank register file to the nodes in the RIG;
computing a Register Conflict Graph (RCG) for the input program that includes the variables represented as nodes in the RCG and uses the physical registers allocated to the nodes in the RIG;
assigning a bank of the multi-bank register file to each node in the RCG;
splitting a node in the RCG into the node and a copy node to enable input operands to be read from the multi-bank register file in a single access cycle for each instruction that specifies the input operands to produce a conflict-free register allocation, wherein a first bank of the multi-bank register file is coupled to a first input of a function unit and is not coupled to a second input of the function unit and a second bank of the multi-bank register file is coupled to the second input of the function unit and is not coupled to the first input of the function unit; and generating an output program corresponding to the input program that uses the conflict-free register allocation.

19. A system for assigning variables to physical registers stored in a multi-bank register file, the system comprising:

the multi-bank register file including different banks that are configured to parallel access in a single access cycle;

a function unit that is configured to receive input operands read from the multi-bank register file and execute program instructions that specify the input operands; and a register allocation unit that is directly coupled to the multi-bank register file and configured to:

compute a Register Interference Graph (RIG) for an input program that includes variables represented as nodes in the RIG;

allocate the physical registers stored in the multi-bank register file to the nodes in the RIG;

compute a Register Conflict Graph (RCG) for the input program that includes the variables represented as nodes in the RCG and uses the physical registers allocated to the nodes in the RIG;

assign a bank of the multi-bank register file to each node in the RCG;

split a node in the RCG into the node and a copy node to produce a conflict-free register allocation; and generate an output program corresponding to the input program that uses the conflict-free register allocation.

20. The system of claim 19, wherein the register allocation unit is further configured to insert a copy operation before an instruction in the input program that uses the node to copy the contents of a first physical register allocated to the node from a first bank to a second bank of the multi-bank register file to produce the copy node, wherein the copy node is allocated to a second physical register.

21. The system of claim 20, wherein the register allocation unit is further configured to replace subsequent uses of the first physical register in the input program with the second physical register.

22. The system of claim 20, wherein the register allocation unit is further configured to select the second bank when the second bank is less used compared with another bank of the multi-bank register file.

23. The system of claim 20, wherein the register allocation unit is further configured to select the second bank when the second bank is aligned with an input of a function unit that receives a variable stored in the second physical register as an input operand for the instruction in the input program.

* * * * *